(12) United States Patent
Lee et al.

(10) Patent No.: US 11,743,677 B2
(45) Date of Patent: Aug. 29, 2023

(54) APPARATUS AND METHOD FOR PROVIDING SERVICE RELATED TO TARGET LOCATION BASED ON UWB

(71) Applicant: Samsung Electronics Co., Ltd., Suwon-si (KR)

(72) Inventors: Mingyu Lee, Suwon-si (KR); Taeyoung Ha, Suwon-si (KR); Kangjin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/463,936

(22) Filed: Sep. 1, 2021

(65) Prior Publication Data

US 2022/0086595 A1   Mar. 17, 2022

(30) Foreign Application Priority Data

Sep. 15, 2020   (KR) .................. 10-2020-0118499

(51) Int. Cl.
*H04W 4/02*   (2018.01)
*H04B 1/69*   (2011.01)

(52) U.S. Cl.
CPC .............. *H04W 4/02* (2013.01); *H04B 1/69* (2013.01)

(58) Field of Classification Search
CPC .......... H04W 4/02; H04W 4/33; H04W 4/80; H04W 4/023; H04B 1/69; G01S 5/0072;

(Continued)

(56) References Cited

U.S. PATENT DOCUMENTS 10,469,754 B2   11/2019   Nagashima et al.
10,678,236 B2   6/2020    Jung et al.
(Continued)

FOREIGN PATENT DOCUMENTS

EP   3 824 784 A1   5/2021
JP   5838638 B2    1/2016
(Continued)

OTHER PUBLICATIONS https://youtu.be/bNSye2tuSVo; Samsung—Point Cleaning; Nov. 10, 2017.

(Continued)

*Primary Examiner* — Sam K Ahn
*Assistant Examiner* — Amneet Singh
(74) *Attorney, Agent, or Firm* — Jefferson IP Law, LLP

(57) ABSTRACT

A method, performed by a first electronic device, of performing ultra-wideband (UWB)-based communication with one or more electronic devices, is provided. The method includes determining first location information associated with a target point, based on an optical sensor and gradient information of the first electronic device, determining second location information associated with a second electronic device, based on the determined first location information and a UWB signal, determining third location information indicating a location of the target point relative to the second electronic device, based on the determined first location information and the determined second location information, and transmitting the determined third location information to the second electronic device so that the second electronic device performs an operation associated with the target point.

17 Claims, 19 Drawing Sheets

(58) Field of Classification Search
CPC .. G01S 5/0249; G01S 5/0258; G01S 5/02695; G01S 5/0284; G01S 13/765; G01S 13/0209; G01S 13/42; H04L 67/025
See application file for complete search history.

(56) References Cited

U.S. PATENT DOCUMENTS

| | | | |
|---|---|---|---|
| 2018/0158316 A1* | 6/2018 | Ham | G08C 17/02 |
| 2019/0339690 A1 | 11/2019 | Kwak et al. | |
| 2020/0117183 A1 | 4/2020 | Moon et al. | |
| 2021/0165421 A1 | 6/2021 | Ko et al. | |

FOREIGN PATENT DOCUMENTS

| | | |
|---|---|---|
| KR | 10-2014-0066850 A | 6/2014 |
| KR | 10-2015-0047893 A | 5/2015 |
| KR | 10-2020-0013178 A | 2/2020 |
| KR | 10-2020-0018197 A | 2/2020 |

OTHER PUBLICATIONS https://youtu.be/zTjriFV7JYI?t=10m9s; Samsung Powerbot VR7000 Robot Vacuum Unboxing/Initial Review, Jan. 25, 2018.
https://youtu.be/h4PuYA_ECwg; Why Hyundai Motor took first place in Super Bowl advertisement, Feb. 19, 2020.
https://youtu.be/7pRA1h4ja1E; Hydrogen electric vehicle Nexo automatic parking, Nov. 24, 2019.
http://youtube.com/watch?v=D154-5ZzPsk; 2020 Hyundai Sonata Remote Smart Parking Assist, Feb. 12, 2020.
http://youtube.com/watch?v=uM33RnBG2j8; BMW 5 Series 19 Year 530i Automatic Parking Function, Remote, Jun. 20, 2019.
International Search Report dated Dec. 10, 2021, issued in International Application No. PCT/KR2021/011756.

* cited by examiner

FIG. 4
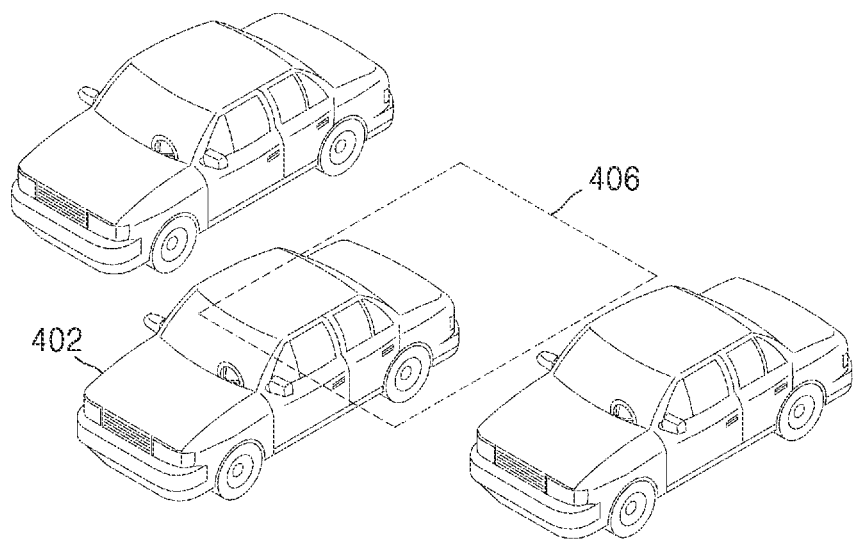
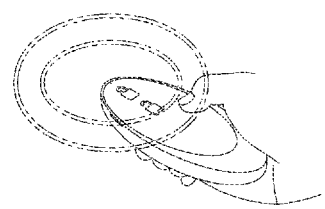

FIG. 15
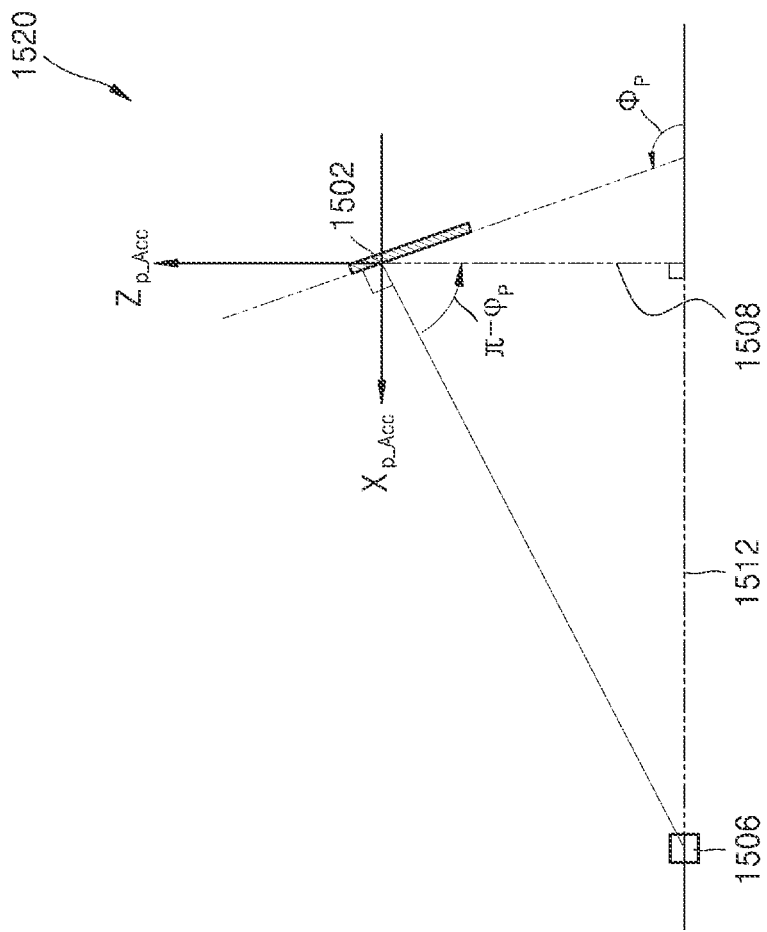
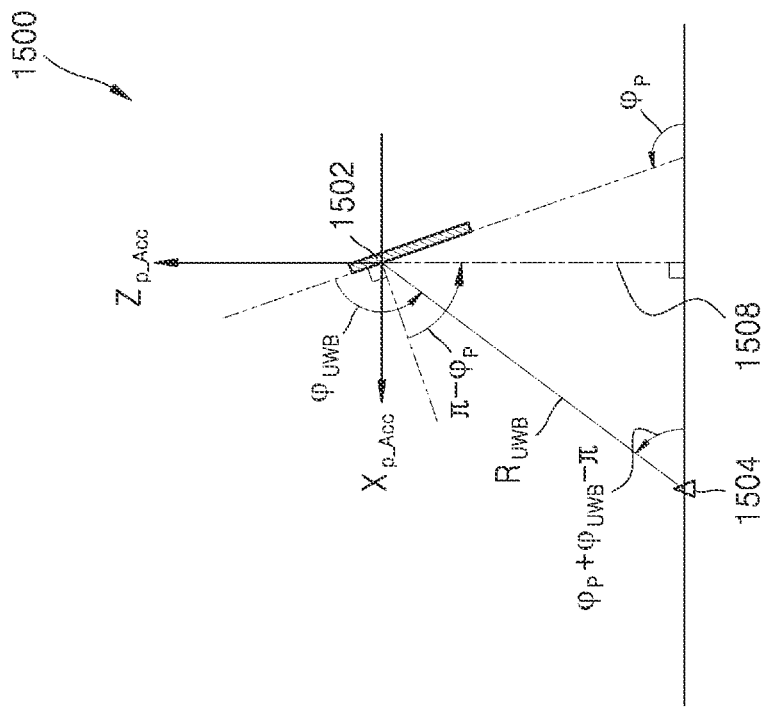

APPARATUS AND METHOD FOR PROVIDING SERVICE RELATED TO TARGET LOCATION BASED ON UWB

CROSS-REFERENCE TO RELATED APPLICATION(S)

This application is based on and claims priority under 35 U.S.C. § 119(a) of a Korean patent application number 10-2020-0118499, filed on Sep. 15, 2020, in the Korean Intellectual Property Office, the disclosure of which is incorporated by reference herein in its entirety.

BACKGROUND

1. Field

The disclosure relates to an apparatus and a method for providing location information of a target point by using an ultra-wideband (UWB) communication method.

2. Description of Related Art

The Internet is evolving from a human-centered connection network through which humans create and consume information to an Internet of Things (IoT) network through which distributed elements, such as objects exchange and process information. Internet of Everything (IoE) technology, which is a combination of IoT technology and big data processing technology through connection with a cloud server, is also emerging. In order to implement the IoT, technology elements, such as sensing technology, wired/wireless communication and network infrastructure, service interface technology, and security technology are required. Technology for inter-object connection, such as sensor network, machine to machine (M2M) communication, or machine-type communication (MTC), has recently been studied.

In an IoT environment, intelligent Internet technology (IT) services that collect and analyze data generated by connected objects and create new value in human life may be provided. The IoT may be applied to fields, such as smart homes, smart buildings, smart cities, smart cars or connected cars, smart grids, health care, smart home appliances, and advanced medical services through convergence and integration of existing information technology (IT) and various industries.

With the development of wireless communication systems, it is possible to provide various services, and there is a need for a method to provide the services effectively. For example, in medium access control (MAC), ranging technology for measuring a distance between electronic devices by using ultra-wideband (UWB) may be used. UWB is radio communication technology that uses a very wide frequency band of several GHz or more in a base band without using a radio carrier wave.

When a first electronic device and a second electronic device communicating through UWB provide a service associated with a target point, the first electronic device needs to effectively provide location information of the target point to the second electronic device.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a first electronic device and a method which may more accurately and efficiently determine information about a location of a target point relative to a second electronic device that performs ultra-wideband (UWB)-based communication with the first electronic device and may transmit the information to the second electronic device.

Additional aspects will be set forth in part in the description which follows and, in part, will be apparent from the description, or may be learned by practice of the presented embodiments.

In accordance with an aspect of the disclosure, a method performed by a first electronic device in a wireless communication system is provided. The method includes determining first location information associated with a target point based on an optical sensor and gradient information of the first electronic device, determining second location information associated with a second electronic device based on the first location information and an ultra-wideband (UWB) signal, determining third location information indicating a location of the target point relative to the second electronic device based on the first location information and the second location information, and transmitting the third location information to the second electronic device, for the second electronic device to perform an operation associated with the target point.

In accordance with another aspect of the disclosure, a method, performed by a first electronic device in a wireless communication system, is provided. The method includes determining height information indicating a height of the first electronic device with respect to a second electronic device based on an ultra-wideband (UWB) signal and gradient information of the first electronic device, determining location information indicating a location of a target point relative to the second electronic device based on the height information and the gradient information, and transmitting the location information to the second electronic device for the second electronic device to perform an operation associated with the target point.

In accordance with another aspect of the disclosure, a first electronic device in a wireless communication system is provided. The method includes a communicator, an optical sensor configured to output an optical signal, a gradient sensor configured to obtain gradient information of the first electronic device, and at least one processor configured to determine first location information associated with a target point based on the optical sensor and the obtained gradient information, determine second location information associated with a second electronic device based on the first location information and an ultra-wideband (UWB) signal, determine third location information indicating a location of the target point relative to the second electronic device based on the first location information and the second location information, and transmit the third location information via the communicator to the second electronic device, fort the second electronic device to perform an operation associated with the target point.

In accordance with another aspect of the disclosure, a first electronic device in a wireless communication system is provided. The first electronic device includes a communicator, an acceleration sensor configured to obtain gradient information of the first electrode device, and at least one processor configured to determine height information indicating a height of the first electronic device with respect to a second electronic device based on an ultra-wideband (UWB) signal and the gradient information of the first electronic device, determine location information indicating a location of a target point relative to the second electronic device based on the height information and the gradient information, and transmit the location information via the communicator to the second electronic device, for the second electronic device to perform an operation associated with the target point.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 is a diagram illustrating a process by which a vehicle controller and a vehicle perform an operation associated with a target point according to an embodiment of the disclosure;

FIG. 15 is a diagram illustrating a process by which a first electronic device determines a location of a target point relative to a second electronic device based on an ultra-wideband (UWB) signal and an acceleration sensor, according to an embodiment of the disclosure;

The same reference numerals are used to represent the same elements throughout the drawings.

DETAILED DESCRIPTION

Figure 1:
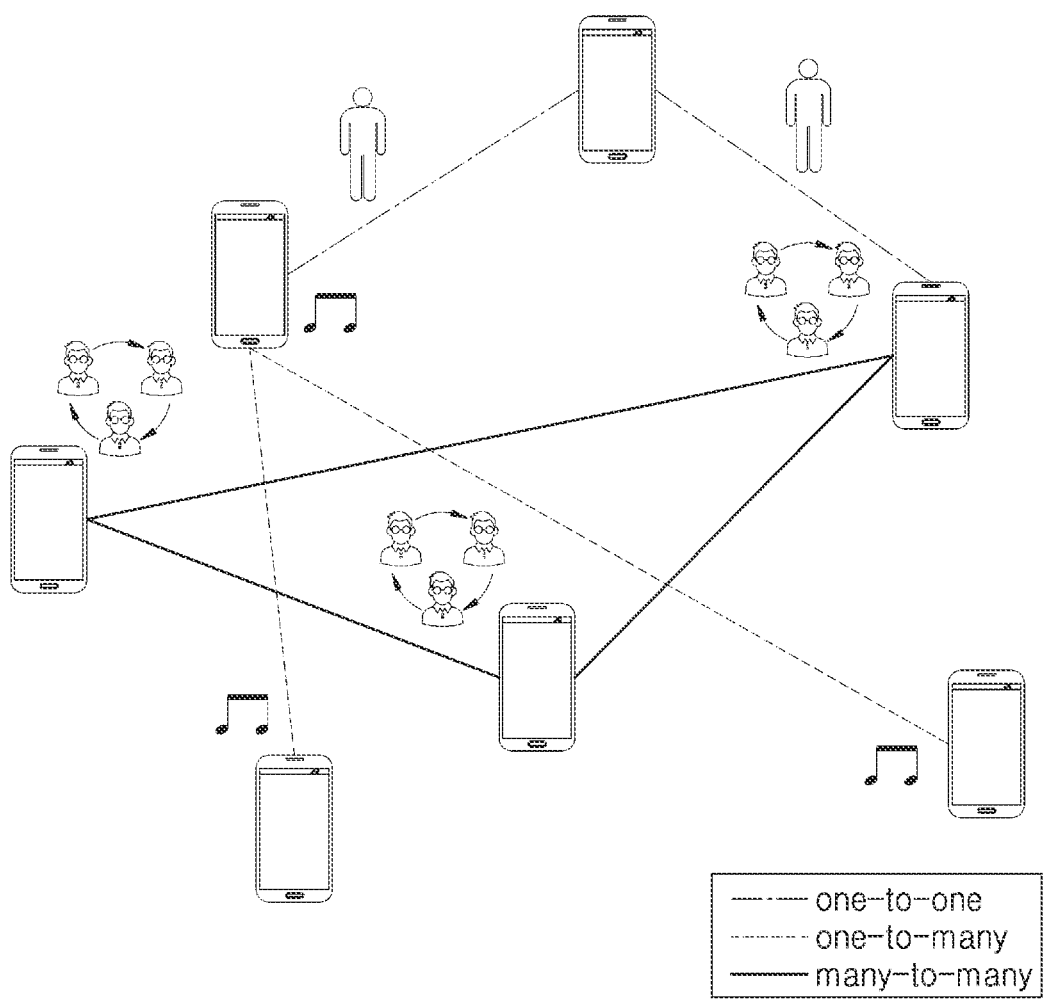
FIG. 1 is a diagram for describing a general device-to-device (D2D) communication procedure according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are regarded as merely exemplary. Accordingly, those of ordinary skill in the art will recognize that various changes and modifications of the various embodiments described herein can be made without departing from the scope and spirit of the disclosure. In addition, descriptions of well-known functions and construction may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is proved for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Throughout the disclosure, the expression "at least one of a, b or c" indicates only a, only b, only c, both a and b, both a and c, both b and c, all of a, b, and c, or variations thereof.

Examples of a terminal may include a user equipment (UE), a mobile station (MS), a cellular phone, a smartphone, a computer, a multimedia system capable of performing a communication function, or the like.

In the disclosure, a controller may also be referred to as a processor.

Throughout the specification, a layer (or layer apparatus) may also be referred to as an entity.

In addition, terms, such as first and second may be used to describe various components but the components should not be limited by the terms. These terms are only used to distinguish one component from another.

In addition, the terms used herein are for the purpose of describing certain embodiments of the disclosure only and are not intended to be limiting of the disclosure. Throughout the specification, when an element is referred to as being "connected" to another element, it will be understood to include that the element is "directly connected" to the other element or is "electrically connected" to the other element with another element therebetween. In addition, it will be understood that when an element is referred to as "including" another element, the element may further include other elements unless mentioned otherwise.

When there is no description explicitly specifying an order of operations of a method according to the disclosure, the operations may be performed in an appropriate order. The disclosure is not limited to the order of the operations described.

The expression "in an embodiment" and the like appearing in various parts of the specification are not intended to refer to the same embodiment.

An embodiment of the disclosure may be represented by functional block configurations and various operations. Some or all of the functional blocks may be implemented by various numbers of hardware and/or software configurations for performing certain functions. For example, the functional blocks of the disclosure may be implemented by one or more microprocessors or by circuit configurations for a certain function. For example, the functional blocks of the disclosure may be implemented in various programming or scripting languages. The functional blocks may be implemented in an algorithm executed by one or more processors. In the disclosure, the prior art may be employed for electronic configuration, signal processing, and/or data processing.

Lines or members connecting elements illustrated in the drawings are merely illustrative of functional connections and/or physical or circuit connections. In an actual device, the connections between components may be represented by various functional connections, physical connections, or circuit connections that are replaceable or added.

In general, wireless sensor network technology is largely classified into wireless local area network (WLAN) and wireless personal area network (WPAN) according to a distance identified. In this case, WLAN is Institute of Electrical and Electronics Engineers (IEEE) 802.11-based technology for connection to a backbone network within a radius of 100 m. WPAN is IEEE 802.15-based technology, and examples of WPAN include Bluetooth, ZigBee, and ultra-wideband (UWB). A wireless network in which such wireless network technology is implemented may be including a plurality of communication electronic devices. In this case, the plurality of communication electronic devices perform communication in an active period by using a single channel. For example, the plurality of communication electronic devices may collect and transmit packets in the active period.

UWB may refer to short-range high-speed radio communication technology using a wide frequency band of several gigahertz (GHz) or more, a low spectral density, and a short pulse width (1 to 4 nsec) in a baseband state. UWB may refer to a band itself to which UWB communication is applied. A ranging method performed between electronic devices will now be described based on a UWB communication method, but the UWB communication method is merely an example and various radio communication technologies may be used in practice.

Electronic devices according to embodiments of the disclosure may include a fixed terminal embodied as a computer device or a mobile terminal, and may communicate with other devices and/or servers by using a wireless or wired communication method. For example, the electronic devices may include, but are not limited to, a smartphone, a mobile terminal, a laptop computer, a digital broadcasting terminal, a personal digital assistant (PDA), a portable multimedia player (PMP), a navigation device, a slate personal computer (PC), a tablet PC, a desktop computer, a digital television (TV), a refrigerator, an artificial intelligence (AI) speaker, a wearable device, a projector, a smart key, a smart car, a printer, a vehicle console, a control device for controlling at least some functions of a vehicle, and a control device for controlling at least some functions of a robot cleaner.

Hereinafter, the disclosure will be described with reference to the accompanying drawings.

FIG. 1 is a diagram for describing a general device-to-device (D2D) communication procedure according to an embodiment of the disclosure.

D2D communication refers to a method in which geographically adjacent electronic devices communicate directly with each other without via an infrastructure, such as a base station.

Referring to FIG. 1, electronic devices may communicate in a one-to-one manner, a one-to-many manner, or a many-to-many manner. In D2D communication, unlicensed frequency bands, such as ultra-wideband (UWB), wireless fidelity direct (Wi-Fi Direct), and Bluetooth may be used. Alternatively, in D2D communication, licensed frequency bands may be used to improve frequency utilization efficiency of cellular systems. Although D2D communication is restrictively used to refer to machine-to-machine communication or machine intelligent communication, in the disclosure, D2D communication is intended to refer to not only communication between electronic devices having a communication function but also communication between various types of electronic devices having a communication function, such as smartphones or PCs.

Figure 2:
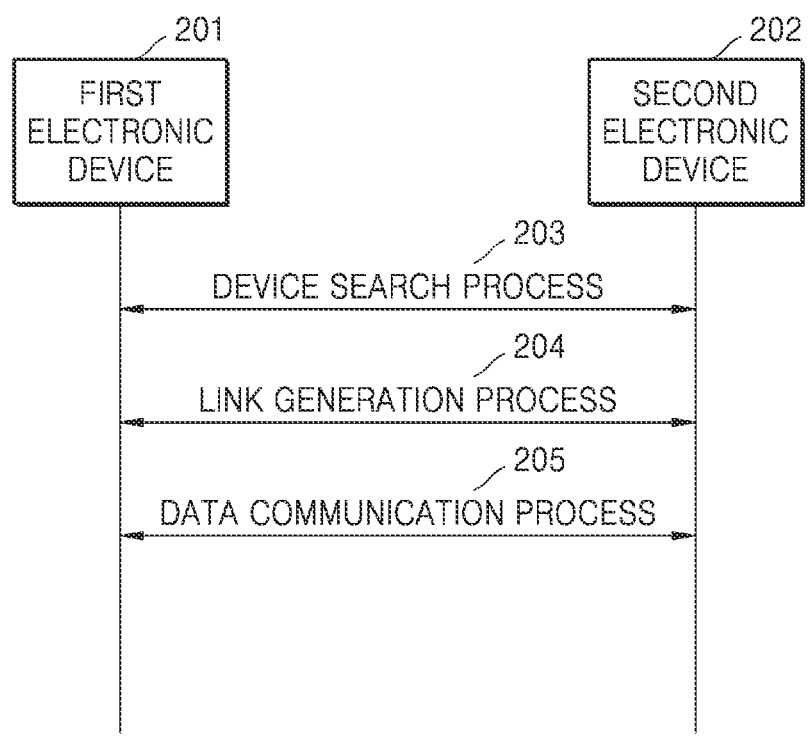
FIG. 2 is a diagram illustrating a communication process among a plurality of electronic devices according to an embodiment of the disclosure.

FIG. 2 is a diagram illustrating a communication process among a plurality of electronic devices according to an embodiment of the disclosure.

Referring to FIG. 2, a first electronic device 201 and a second electronic device 202 may perform communication through a device search process 203, a link generation process 204, and a data communication process 205.

In the device search process 203, each of the first electronic device 201 and the second electronic device 202 may search for other electronic devices capable of performing D2D communication among electronic devices around the first electronic device 201 and the second electronic device 202. Through this, each of the first electronic device 201 and the second electronic device 202 may determine whether a link for performing D2D communication is generated. For example, the first electronic device 201 may transmit a search signal to allow the second electronic device 202 to search for the first electronic device 201. In addition, the first electronic device 201 may receive a search signal from the second electronic device 202 and may identify that other electronic devices capable of performing D2D communication are within a D2D communication range.

In the link generation process 204, each of the first electronic device 201 and the second electronic device 202 may generate a link for transmitting data to an electronic device, to which the data is to be transmitted, from among the electronic devices found in the device search process 203. For example, the first electronic device 201 may generate a link for transmitting data to the second electronic device 202 found in the device search process 203.

In the data communication process 205, each of the first electronic device 201 and the second electronic device 202 may transmit or receive data to or from devices that generate a link in the link generation process 204. For example, the first electronic device 201 may transmit or receive data to or from the second electronic device 202 through the link generated in the link generation process 204.

Various embodiments of the disclosure relate to medium access control (MAC) based on the D2D communication, and for the MAC, a distance between electronic devices may have to be measured. Here, UWB ranging technology may be used to measure the distance between the electronic devices.

For example, when a digital key stored in a smartphone is used to open or close the door of a vehicle, the vehicle may measure a distance between the smartphone and the vehicle by using a number of UWB communication modules (e.g., six UWB communication modules) and then may estimate a location of the smartphone based on a result of the measurement. The vehicle may automatically open the door when a distance between the vehicle and the smartphone is equal to or less than a certain distance, thereby improving user convenience. The vehicle and the smartphone may use multicast ranging or broadcast ranging.

The first electronic device 201 and the second electronic device 202 using UWB ranging technology may exchange a message with each other, and may measure a distance therebetween based on a transmission/reception time of the exchanged message. Because UWB ranging technology involves transmitting or receiving a signal by using a bandwidth of 500 megahertz (MHz), the UWB ranging technology may be more advantageous for signal detection than other wireless communication technologies, and may provide an accurate distance measurement result.

In addition, according to an embodiment of the disclosure, angle of attack (AoA) technology based on UWB may be used to measure a direction between electronic devices. AoA technology based on UWB refers to technology of measuring a direction based on a signal reception time for each antenna, when a message for UWB ranging is exchanged.

According to an embodiment of the disclosure, an acceleration sensor for determining an angle formed between the ground surface and a first electronic device may be used. The acceleration sensor may measure a force applied to the first electronic device or a change in a speed of the first electronic device based on three axes including an x-axis, a y-axis, and a z-axis to determine an acceleration of the first electronic device. When the first electronic device is in a static state, the first electronic device may determine an angle formed between the ground surface and the first electronic device based on the acceleration of gravity through the acceleration sensor.

According to an embodiment of the disclosure, time of flight (ToF) technology may be used to measure a distance between a first electronic device and an object. ToF technology refers to technology of measuring a time taken by an infrared (IR) ray that is output toward an object, is reflected from the object, and returns to determine a distance between a first electronic device and the object.

Figure 3:
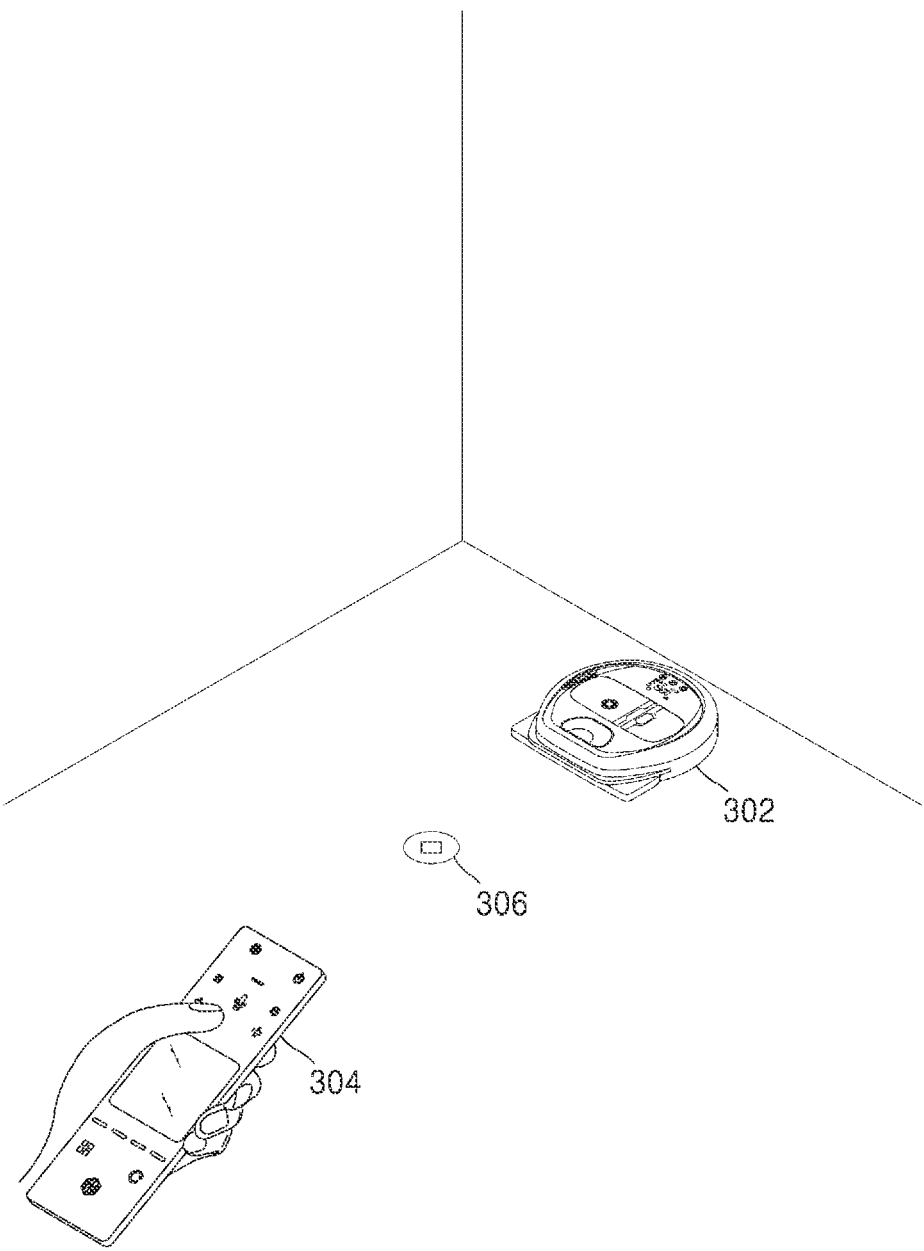
FIG. 3 is a diagram illustrating a process by which a remote controller and a robot cleaner perform an operation associated with a target point according to an embodiment of the disclosure.

FIG. 3 is a view illustrating a process by which a remote controller and a robot cleaner perform an operation associated with a target point according to an embodiment of the disclosure.

Referring to FIG. 3, when a user wants to clean a specific portion of a bottom surface through a robot cleaner 302, the user may select a target point 306 corresponding to the specific portion by using a remote controller 304. For example, the user may select the target point 306 by outputting a laser pointer to a desired location on the bottom surface by using the remote controller 304.

The robot cleaner 302 may obtain information about a location of the target point 306 by detecting the laser pointer through a sensor. The robot cleaner 302 may perform an operation associated with the target point 306 based on the obtained information about the location of the target point 306. For example, the robot cleaner 302 may move to the location of the target point 306 and then may perform cleaning.

The above method by which the robot cleaner 302 obtains the information about the location of the target point 306 by detecting the laser pointer output from the remote controller 304 has the following problem. First, the user must use the remote controller 304, and a range that may be pointed by using the laser pointer may be limited. The user should continue to point until the robot cleaner 302 reaches the target point 306, the performance of the robot cleaner 302 in detecting the laser pointer may be poor under bright lights or on a black bottom surface.

FIG. 4 is a diagram illustrating a process by which a vehicle controller and a vehicle perform an operation associated with a target point according to an embodiment of the disclosure.

Although not shown in FIG. 4, a vehicle controller may be mounted inside a vehicle 402.

Referring to FIG. 4, the vehicle controller may scan a parking space 406 and may provide a scan result to a user through a display inside the vehicle 402. The user may select the parking space 406 based on the provided scan result, and the vehicle 402 may park in the selected parking space. The user may determine whether to drive or stop the vehicle 402 while parking the vehicle 402. For example, the user may determine whether to drive or stop the vehicle 402 by using a vehicle key after getting out of the vehicle 402.

The above method by which the parking space 406 is scanned by using the vehicle controller has a problem in that it is difficult to specify the parking space 406 because accuracy is not high.

In order to address the issues described referring to FIGS. 3 and 4, UWB ranging may be used. For example, a first electronic device corresponding to the remote controller 304 of FIG. 3 or the vehicle controller of FIG. 4 may obtain information about a location of a second electronic device corresponding to the robot cleaner 302 of FIG. 3 or the vehicle 402 of FIG. 4 through at least one of UWB ranging technology or AoA technology based on UWB. The first electronic device may obtain location information associated with a target point selected by the user through a sensor. The sensor may include at least one of a laser sensor, a gyro sensor, a ToF sensor, a camera sensor, or a radar sensor.

In order for the second electronic device to move to the target point, the first electronic device may transmit the location information associated with the target point to the second electronic device. However, coordinate axes of the first electronic device and coordinate axes of the second electronic device may be different from each other, and the location information associated with the target point obtained through the sensor may be information determined based on the coordinate axes of the first electronic device.

Accordingly, when the coordinate axes of the first electronic device and the coordinate axes of the second electronic device are different from each other, the first electronic device may convert the location information associated with the target point obtained through the sensor into information about a location of the target point relative to the second electronic device. That is, the first electronic device may convert the location information of the target point determined based on the coordinate axes of the first electronic device into information based on the coordinate axes of the second electronic device.

Because the second electronic device may perform an operation associated with the target point according to the location information of the target point received from the first electronic device by using UWB ranging technology or AoA technology based on UWB, accuracy may be higher than that of other wireless technologies, but there is a problem in that an error still exists between the target point selected by the user and a location to which the second electronic device actually moves.

When the location information about the target point is obtained by using an optical signal, such as a ToF sensor or a camera sensor, there is a problem in that it is difficult to measure a distance when an obstacle is located between the target point and the first electronic device.

When the location information about the target point is obtained by using an optical signal, such as a ToF sensor a camera sensor, there is still a problem in that the accuracy of distance measurement is reduced due to natural light.

According to an embodiment of the disclosure, a first electronic device may determine height information indicating a height of the first electronic device from a bottom surface on which a second electronic device moves by using ToF technology and an acceleration sensor, and may determine an elevation angle of the first electronic device with respect to the second electronic device by using the determined height information and UWB ranging technology. The elevation angle of the first electronic device with respect to the second electronic device determined by using the ToF technology, the acceleration sensor, and the UWB ranging technology may provide a more accurate location of the target point relative to the second electronic device than an elevation angle of the first electronic device with respect to the second electronic device calculated by using AoA technology based on UWB.

According to an embodiment of the disclosure, a first electronic device may determine location information of a target point covered by an obstacle by using ToF technology and an acceleration sensor. The first electronic device may obtain information about a surface on which a second electronic device is located by using the ToF technology and the acceleration sensor. When the target point is not located on the surface on which the second electronic device is located, the first electronic device may correct a location of the target point so that the target point is located on the surface on which the second electronic device is located. Accordingly, even when the target point is covered by the obstacle, the first electronic device may determine a location of the target point relative to the second electronic device, by correcting the location of the target point so that the target point is located on the surface on which the second electronic device is located.

According to an embodiment of the disclosure, location information about a target point may be determined by using an acceleration sensor and UWB ranging technology without using ToF technology. Unlike the ToF technology, the acceleration sensor and the UWB ranging technology are not affected by natural light or a color of a bottom surface. Accordingly, when only the acceleration sensor and the UWB ranging technology are used, the accuracy of distance measurement may not be reduced even in an environment where there is natural light.

According to an embodiment of the disclosure, a first electronic device may identify a second electronic device selected by a user from among a plurality of second electronic devices by using ToF technology and UWB ranging technology. For example, the first electronic device may determine first distance information indicating a distance between the first electronic device and the second electronic device selected by the user by using the ToF technology. The first electronic device may determine second distance information indicating a distance between the first electronic device and each of the plurality of electronic devices performing UWB communication with the first electronic device by using the UWB ranging technology. The first electronic device may identify the second electronic device selected by the user from among the plurality of electronic devices based on the first distance information and the second distance information.

The first electronic device may determine whether the second electronic device may move to a space corresponding to a target point selected by the user, based on physical information about the identified second electronic device. For example, the physical information about the second electronic device may include a size, a shape, a height, or the like, of the second electronic device. Accordingly, a process of identifying the second electronic device and a process of determining the target point to which the second electronic device is to move may be further simplified.

Figure 5:
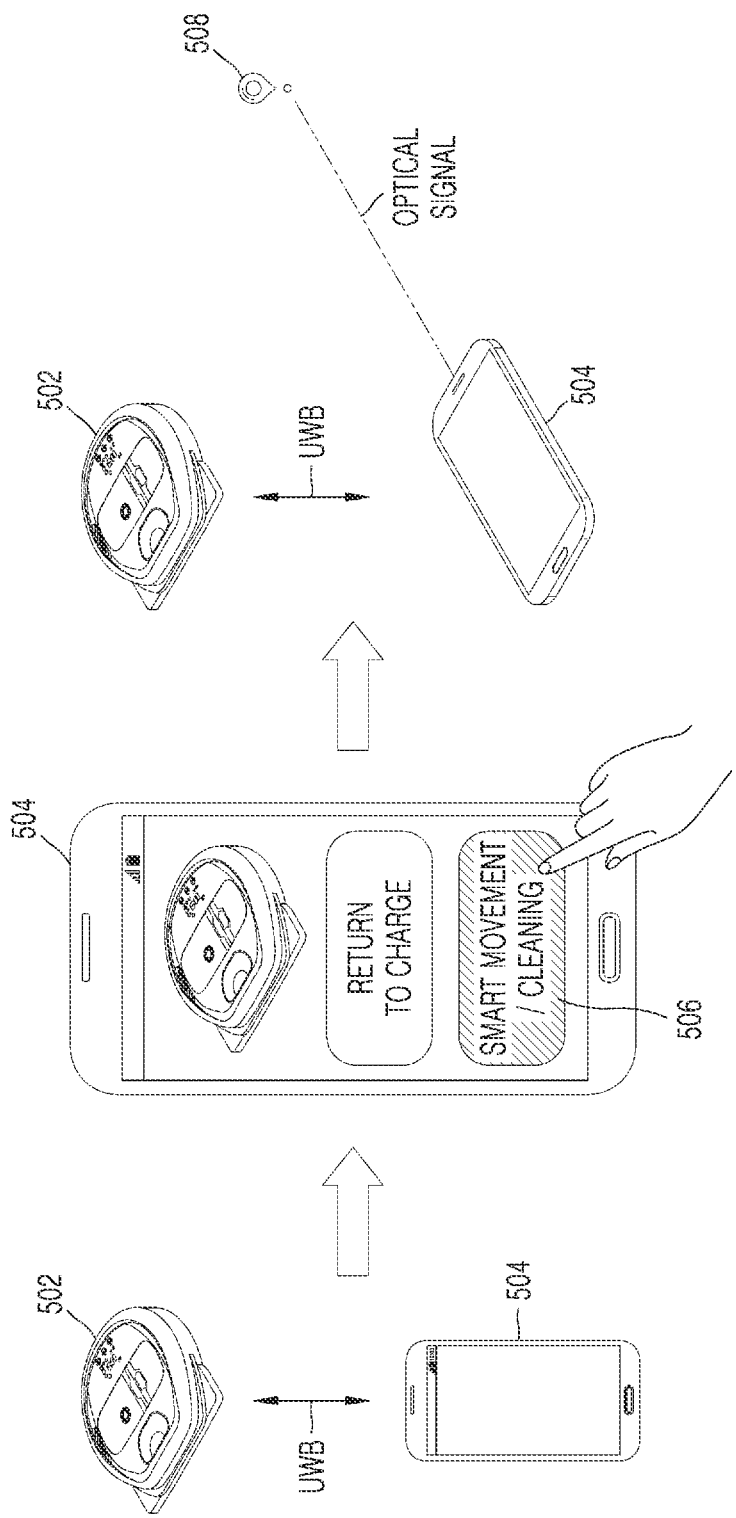
FIG. 5 is a view illustrating a process by which a first electronic device provides location information about a target point to a second electronic device, according to an embodiment of the disclosure.

FIG. 5 is a view illustrating a process by which a first electronic device provides location information about a target point to a second electronic device, according to an embodiment of the disclosure.

Referring to FIG. 5, a first electronic device 504 may include a smartphone, and a second electronic device 502 may include the robot cleaner 302 of FIG. 3. However, the first electronic device 504 and the second electronic device 502 are not limited to the above devices. For example, the first electronic device 504 and the second electronic device 502 may respectively include various devices performing functions of controllers and various devices performing functions of controlees controlled by the various devices performing the functions of the controllers through UWB-based communication.

The first electronic device 504 may identify the second electronic device 502 selected by a user from among a plurality of electronic devices performing UWB-based communication with the first electronic device 504 based on at least one of UWB ranging technology, AoA technology based on UWB, or ToF technology.

The first electronic device 504 may determine first distance information indicating a distance between the first electronic device 504 and the second electronic device 502 selected by the user by using the ToF technology. The first electronic device 504 may determine second distance information indicating a distance between the first electronic device 504 and each of the plurality of electronic devices performing UWB-based communication with the first electronic device 504 by using the UWB ranging technology. The first electronic device 504 may identify an electronic device in which a difference between the distance measured by using the ToF technology and the distance measured by using the UWB ranging technology is less than a certain threshold value as the second electronic device based on the determined first distance information and the determined second distance information.

For example, when there are two vehicles performing UWB-based communication with a mobile phone of the user and the user wants to park a first vehicle, the mobile phone may measure a distance between the mobile phone and the first vehicle by using the ToF technology. The mobile phone may measure a distance between the mobile phone and the first vehicle and a distance between the mobile phone and a second vehicle by using the UWB ranging technology.

The mobile phone may determine a first difference value indicating a difference between the distance between the mobile phone and the first vehicle measured by using the ToF technology and the distance between the mobile phone and the first vehicle measured by using the UWB technology. The mobile phone may determine a second difference value indicating a difference between the distance between the mobile phone and the first vehicle measured by using the ToF technology and the distance between the mobile phone and the second vehicle measured by using the UWB technology.

The mobile phone may compare the first difference value with a certain threshold value, and may compare the second difference value with the certain threshold value. When only the first difference value from among the first difference value and the second difference value is less than the certain threshold value, the mobile phone may identify the first vehicle as a vehicle selected by the user.

When the second electronic device 502 selected by the user is identified, the first electronic device 504 may select a service 506 associated with a target point 508 from among services provided by the second electronic device 502. For example, referring to FIG. 5, a plurality of services provided by the robot cleaner may be displayed on a screen of the mobile phone, and the user may select the service 506 in which the robot cleaner moves to a specific location and cleans through the mobile phone.

When the service 506 associated with the target point 508 is selected, the user may specify the target point 508 by using a ToF sensor or an optical signal through the first electronic device 504. However, a sensor used to specify the target point 508 is not limited to the ToF sensor and may include at least one of a laser sensor, a gyro sensor, a camera sensor, or a radar sensor.

The first electronic device 504 may measure a distance between the first electronic device 504 and the target point 508 by using the ToF sensor. The first electronic device 504 may determine a height of the first electronic device 504 from the ground surface by using an acceleration sensor and the determined distance between the first electronic device 504 and the target point. In general, a surface on which the second electronic device 502 moves may correspond to the ground surface, and a surface on which the target point 508 is located may also correspond to the ground surface. However, a criterion for determining the height of the first electronic device 504 is not limited to the ground surface, and may include any type of surface related to the surface on which the second electronic device 502 moves.

Once the target point 508 is specified, the first electronic device 504 may determine location information about the second electronic device 502. The first electronic device 504 may obtain information about a distance and a direction between the first electronic device 504 and the second electronic device 502 by using the UWB ranging technology and the AoA technology based on UWB.

According to an embodiment of the disclosure, the first electronic device 504 may determine an elevation angle of the first electronic device 504 with respect to the second electronic device 502 by using information about the height of the first electronic device 504 from the ground surface measured by using the ToF sensor. The elevation angle of the first electronic device 504 with respect to the second electronic device 502 refers to an angle formed between a line segment associated with the information about the height of the first electronic device 504 from the ground surface and a line segment associated with the distance between the first electronic device 504 and the second electronic device 502.

The first electronic device 504 may determine location information of the target point 508 relative to the second electronic device 502 based on location information about the target point 508 and the location information about the second electronic device 502. Coordinate axes of the first electronic device 504 and the coordinate axes of the second electronic device 502 may be different from each other. Because the location information about the target point 508 determined by the first electronic device 504 by using the ToF technology is information determined based on the coordinate axes of the first electronic device 504, in order for the second electronic device 502 to move to the target point, the location information about the target point 508 determined based on the coordinate axes of the first electronic device 504 needs to be corrected based on the coordinate axes of the second electronic device 502.

Figure 6:
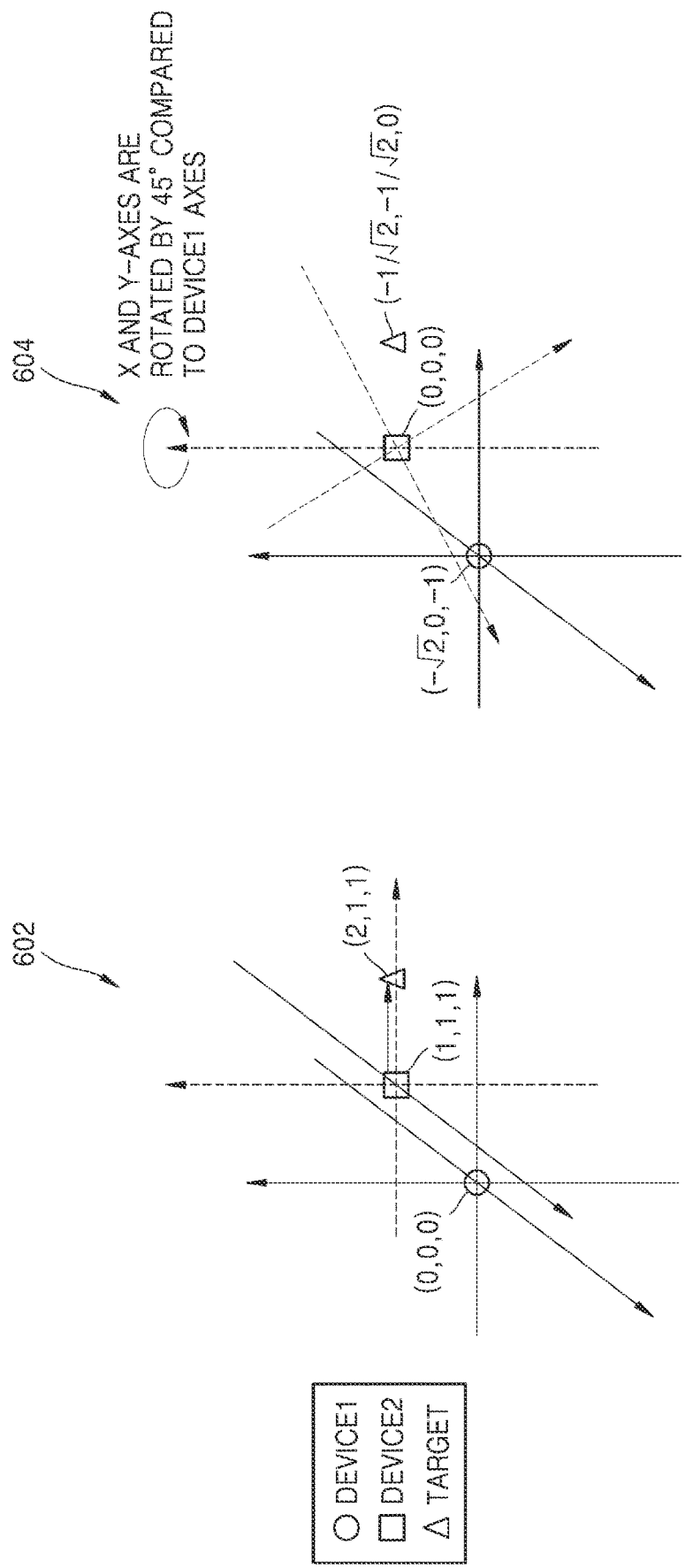
FIG. 6 is a diagram illustrating a process by which a first electronic device determines a location of a target point according to whether coordinate axes of the first electronic device and coordinate axes of a second electronic device match each other, according to an embodiment of the disclosure.

FIG. 6 is a diagram illustrating a process by which a first electronic device determines a location of a target point according to whether coordinate axes of the first electronic device and coordinate axes of a second electronic device match each other, according to an embodiment of the disclosure.

Referring to FIG. 6, when first coordinate axes of a first electronic device DEVICE1 and second coordinate axes of a second electronic device DEVICE2 match each other (602), the first electronic device DEVICE1 does not need to correct information about a location of a target point TARGET determined based on the first coordinate axes to information based on the second coordinate axes.

For example, referring to FIG. 6, from a viewpoint of the first electronic device DEVICE1, in order for the second electronic device DEVICE2 to move to the location of the target point TARGET, the second electronic device DEVICE2 should move by a value of '1' in a positive direction of the X-axis. Because the first coordinate axes and the second coordinate axes match each other, even from a viewpoint of the second electronic device DEVICE2, in order for the second electronic device DEVICE2 to move to the location of the target point TARGET, the second electronic device DEVICE2 should move by a value of '1' in the positive direction of the X-axis. Accordingly, when the first coordinate axes and the second coordinate axes match each other (602), the first electronic device DEVICE1 does not need to separately determine location information about the target point relative to the second electronic device DEVICE2.

In contrast, when the first coordinate axes and the second coordinate axes do not match each other (604), the first electronic device DEVICE1 needs to correct the information about the location of the target point TARGET determined based on the first coordinate axes to information based on the second coordinate axes.

For example, referring to FIG. 6, from a viewpoint of the first electronic device DEVICE1, in order for the second electronic device DEVICE2 to move to the location of the target point TARGET, the second electronic device DEVICE2 should move by a value of '1' in a positive direction of the X-axis. In contrast, in the second coordinate axes, the X and Y-axes are rotated by 45° compared to the first coordinate axes. Accordingly, from a viewpoint of the second electronic device DEVICE2, in order for the second electronic device DEVICE2 to move to the location of the target point TARGET, the second electronic device DEVICE2 should move by a value of '1/$\sqrt{2}$' in a negative direction of the X-axis and should move by a value of '1/$\sqrt{2}$' in a negative direction of the Y-axis. Accordingly, when the first coordinate axes and the second coordinate axes do not match each other (604), the first electronic device DEVICE1 should determine the location information about the target point relative to the second electronic device DEVICE2.

Figure 7:
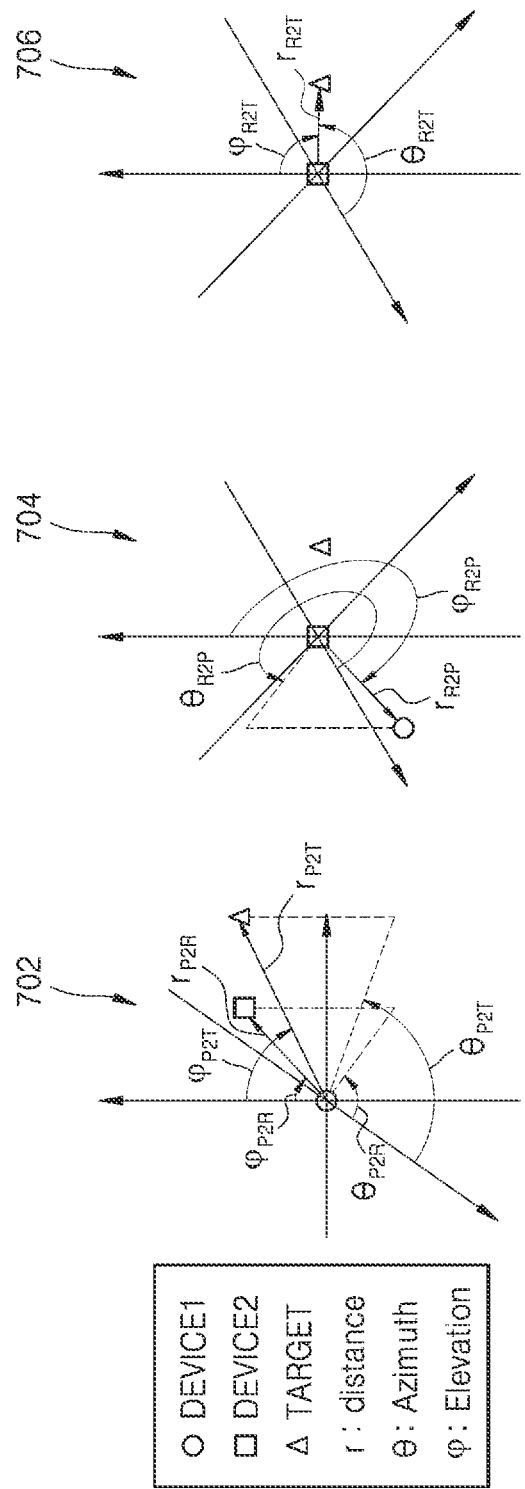
FIG. 7 is a diagram illustrating a process by which a first electronic device determines information about a location of a target point relative to a second electronic device, according to an embodiment of the disclosure.

FIG. 7 is a diagram illustrating a process by which a first electronic device determines information about a location of a target point relative to a second electronic device, according to an embodiment of the disclosure.

Referring to FIG. 7, a three-dimensional (3D) coordinate space 702 in which the second electronic device DEVICE2 and the target point TARGET are illustrated based on coordinate axes of the first electronic device DEVICE1, the first electronic device DEVICE1 may determine location information about the target point TARGET and location information about the second electronic device DEVICE2. The first electronic device DEVICE1 may determine a distance $r_{P2T}$ between the first electronic device DEVICE1 and the target point TARGET by using ToF technology. The first electronic device DEVICE1 may obtain a direction vector from the first electronic device DEVICE1 to the target point TARGET by using the ToF technology. The first electronic device DEVICE1 may determine an elevation angle $\varphi_{P2T}$ of the target point with respect to the first electronic device DEVICE1 and an azimuth angle $\theta_{P2T}$ of the target point with respect to the first electronic device DEVICE1 based on the obtained direction vector.

The elevation angle $\varphi_{P2T}$ of the target point with respect to the first electronic device DEVICE1 refers to an angle formed between the Z-axis of the first electronic device DEVICE1 and a line segment associated with the distance $r_{P2T}$ between the first electronic device DEVICE1 and the target point TARGET. The azimuth angle $\theta_{P2T}$ of the target point with respect to the first electronic device DEVICE1 refers to an angle formed between the X-axis of the first electronic device DEVICE1 and a line segment associated with an orthogonal projection onto an XY plane of the first electronic device DEVICE1 of the line segment associated with the distance $r_{P2T}$ between the first electronic device DEVICE1 and the target point TARGET.

The first electronic device DEVICE1 may determine a distance $r_{P2R}$ between the first electronic device DEVICE1 and the second electronic device DEVICE2 by using UWB ranging technology. The first electronic device DEVICE1 may determine an elevation angle $\varphi_{P2R}$ of the second electronic device DEVICE2 with respect to the first electronic device DEVICE1 and an azimuth angle $\theta_{P2R}$ of the second electronic device DEVICE2 with respect to the first electronic device DEVICE1 based on AoA technology based on UWB.

The elevation angle $\varphi_{P2R}$ of the second electronic device DEVICE2 with respect to the first electronic device DEVICE1 refers to an angle formed between the Z-axis of the first electronic device DEVICE1 and a line segment associated with the distance rpm. between the first electronic device DEVICE1 and the second electronic device DEVICE2. The azimuth angle $\theta_{P2R}$ of the second electronic device DEVICE2 with respect to the first electronic device DEVICE1 refers to an angle formed between the X-axis of the first electronic device DEVICE1 and a line segment associated with an orthogonal projection onto an XY plane of the first electronic device DEVICE1 of the line segment associated with the distance $r_{P2R}$ between the first electronic device DEVICE1 and the second electronic device DEVICE2.

Referring to a 3D coordinate space 704 in which the first electronic device DEVICE1 and the target point TARGET are illustrated based on coordinate axes of the second electronic device DEVICE2, the second electronic device DEVICE2 may determine information indicating a distance $r_{R2P}$ between the second electronic device DEVICE2 and the first electronic device DEVICE1 by using the UWB ranging technology. The second electronic device DEVICE2 may determine information indicating an elevation angle $\varphi_{R2P}$ of the first electronic device DEVICE1 with respect to the second electronic device DEVICE2 and information indicating an azimuth angle $\theta_{R2P}$ of the first electronic device DEVICE1 with respect to the second electronic device DEVICE2 based on the AoA technology based on UWB.

The elevation angle $\varphi_{R2P}$ of the first electronic device DEVICE1 with respect to the second electronic device DEVICE2 refers to an angle formed between the Z-axis of the second electronic device DEVICE2 and a line segment associated with the distance $r_{R2P}$ between the second electronic device DEVICE2 and the first electronic device DEVICE1. The azimuth angle $\theta_{R2P}$ of the first electronic device DEVICE1 with respect to the second electronic device DEVICE2 refers to an angle formed between the X-axis of the second electronic device DEVICE2 and a line segment associated with an orthogonal projection onto an XY plane of the second electronic device of the line segment associated with a distance $r_{R2P}$ between the second electronic device DEVICE2 and the first electronic device DEVICE1.

The second electronic device DEVICE2 may transmit, to the first electronic device DEVICE1, information indicating the determined distance $r_{R2P}$ between the second electronic device DEVICE2 and the first electronic device DEVICE1, information indicating the elevation angle $\varphi_{R2P}$ of the first electronic device DEVICE1 with respect to the second electronic device DEVICE2, and information indicating the azimuth angle $\theta_{R2P}$ of the first electronic device DEVICE1 with respect to the second electronic device DEVICE2.

Referring to a 3D coordinate space 706 in which the target point TARGET is illustrated based on the coordinate axes of the second electronic device DEVICE2, the first electronic device DEVICE1 may determine location information about the target point TARGET with respect to the second electronic device DEVICE2 based on distance and angle information of the target point TARGET with respect to the first electronic device DEVICE1, distance and angle information of the second electronic device DEVICE2 with respect to the first electronic device DEVICE1, and distance and angle information of the first electronic device DEVICE1 with respect to the second electronic device DEVICE2 received from the second electronic device DEVICE2. The first electronic device DEVICE1 may transmit the location information of the target point TARGET with respect to the second electronic device DEVICE2 to the second electronic device DEVICE2.

For example, the first electronic device DEVICEW1 may determine coordinates of the target point TARGET relative to the second electronic device DEVICE2. The first electronic device DEVICE1 may determine a distance $r_{R2T}$ between the second electronic device DEVICE2 and the target point TARGET, an azimuth angle $\theta_{R2T}$ of the target point TARGET with respect to the second electronic device DEVICE2, and an elevation angle $\varphi_{R2T}$ of the target point with respect to the second electronic device DEVICE2, based on the determined coordinates of the target point TARGET.

FIGS. 8 to 11 are diagrams for describing a specific method by which the first electronic device DEVICE1 determines location information of the target point TARGET with respect to the second electronic device DEVICE2.

Figure 8:
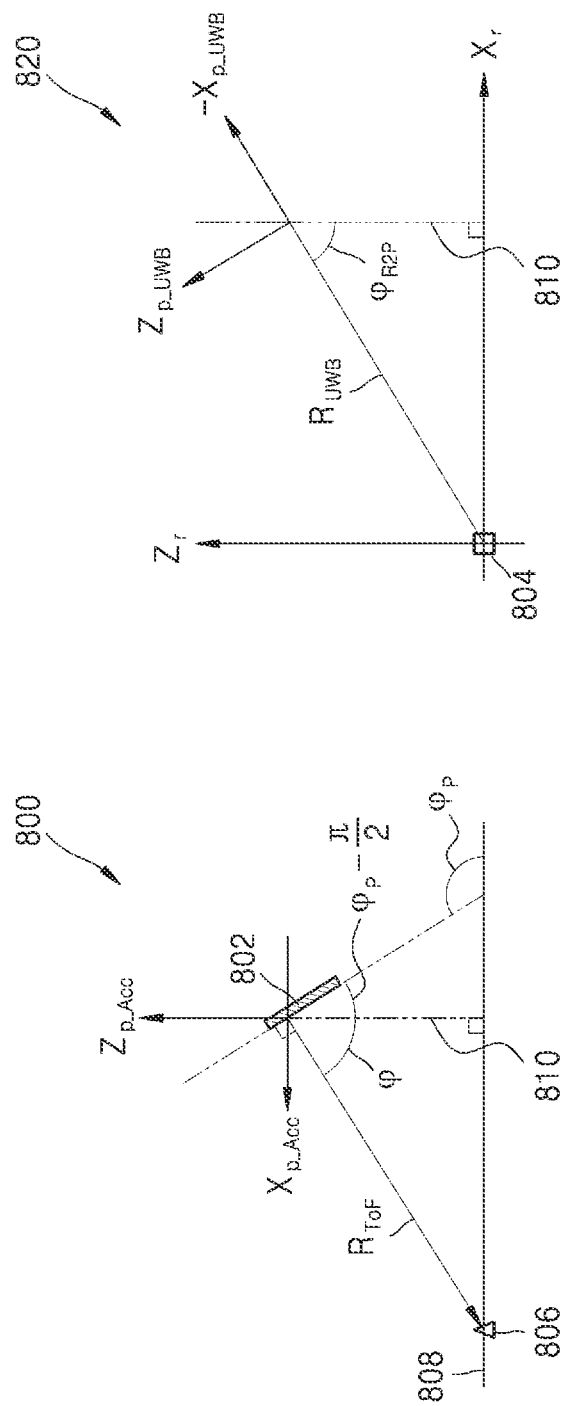
FIG. 8 is a diagram illustrating a process by which a first electronic device determines location information associated with a second electronic device, according to an embodiment of the disclosure.

FIG. 8 is a diagram illustrating a process by which a first electronic device determines location information associated with a second electronic device, according to an embodiment of the disclosure.

Referring to FIG. 8, a coordinate surface 800 illustrating a first electronic device 802 and a target point 806, the first electronic device 802 may obtain a distance $R_{ToF}$ between the first electronic device 802 and the target point 806 by using ToF technology. The first electronic device 802 may obtain a gradient $\varphi_p$ of the first electronic device 802 by using an acceleration sensor. The gradient $\varphi_p$ of the first electronic device 802 refers to an angle formed between a ground surface 808 and the first electronic device 802.

The first electronic device 802 may determine an elevation angle $\varphi$ of the first electronic device 802 with respect to the target point 806 based on the distance $R_{ToF}$ between the first electronic device 802 and the target point 806 and the gradient $\varphi_p$ of the first electronic device 802. The elevation angle of the first electronic device 802 with respect to the target point 806 refers to an angle formed between a line segment associated with the distance $R_{ToF}$ between the first electronic device 802 and the target point 806 and a line segment associated with a height 810 of the first electronic device 802 from the ground surface 808. For example, the ground surface 808 refers to a surface on which a second electronic device 804 moves. The first electronic device 802 may determine the height 810 of the first electronic device 802 from the ground surface 808 based on the distance $R_{ToF}$ between the first electronic device 802 and the target point 806 and the elevation angle $\varphi$ of the first electronic device 802 with respect to the target point 806.

Referring to a coordinate surface 820 illustrating the first electronic device and the second electronic device 804, the first electronic device may determine an elevation angle $\varphi_{R2P}$ of the first electronic device with respect to the second electronic device 804 based on the height 810 of the first electronic device 802 obtained by using the ToF technology and a gradient sensor. This is because that both the second electronic device 804 and the target point 806 are located on the ground surface 808, and thus a height of the first electronic device with respect to the target point 806 and a height of the first electronic device with respect to the second electronic device 804 are the same.

The first electronic device may obtain a distance $R_{UWB}$ between the first electronic device and the second electronic device 804 by using UWB ranging technology. The first electronic device 802 may determine the elevation angle $\varphi_{R2P}$ of the first electronic device with respect to the second electronic device 804 based on the distance $R_{UWB}$ between the first electronic device and the second electronic device 804 and information about the height 810 of the first electronic device obtained by using the ToF technology and the gradient sensor.

Figure 9:
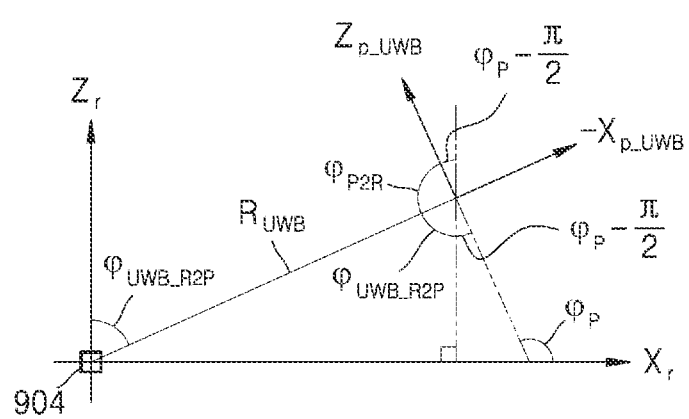
FIG. 9 is a diagram illustrating a process of correcting an azimuth angle between a first electronic device and a second electronic device, according to an embodiment of the disclosure.

FIG. 9 is a diagram illustrating a process of correcting an azimuth angle between a first electronic device and a second electronic device, according to an embodiment of the disclosure.

Referring to FIG. 9, the first electronic device may obtain an elevation angle $\varphi_{P2R}$ of a second electronic device 904 with respect to the first electronic device by using AoA technology based on UWB. The first electronic device may determine an elevation angle $\varphi_{UWB\_R2P}$ of the first electronic device with respect to the second electronic device 904 based on the elevation angle $\varphi_{P2R}$ of the second electronic device 904 with respect to the first electronic device and the gradient $\varphi_p$ of the first electronic device obtained through the acceleration sensor.

Alternatively, the first electronic device may receive information about the elevation angle $\varphi_{UWB\_R2P}$ of the first electronic device with respect to the second electronic device 904 from the second electronic device 904. For example, the second electronic device 904 may determine the elevation angle $\varphi_{UWB\_R2P}$ of the first electronic device with respect to the second electronic device 904 by using the AoA technology based on UWB, and then may transmit information about the elevation angle $\varphi_{UWB\_R2P}$ of the first electronic device with respect to the second electronic device 904 to the second electronic device 904.

The first electronic device 802 may correct the azimuth angle $\theta_{R2P}$ of the first electronic device DEVICE1 with respect to the second electronic device DEVICE2 or the azimuth angle $\theta_{P2R}$ of the second electronic device DEVICE2 with respect to the first electronic device DEVICE1 described with reference to FIG. 7 based on a difference between the elevation angle $\varphi_{R2P}$ of the first electronic device 802 with respect to the second electronic device 804 determined based on the information about the height 810 of the first electronic device 802 obtained by using the ToF technology and the gradient sensor and the distance $R_{UWB}$ between the first electronic device 802 and the second electronic device 804 as described with reference to FIG. 8 and the elevation angle $\varphi_{UWB\_R2P}$ of the first electronic device with respect to the second electronic device 904 determined based on at least one of the AoA technology based on UWB or the UWB ranging technology as described with reference to FIG. 9.

Figure 10:
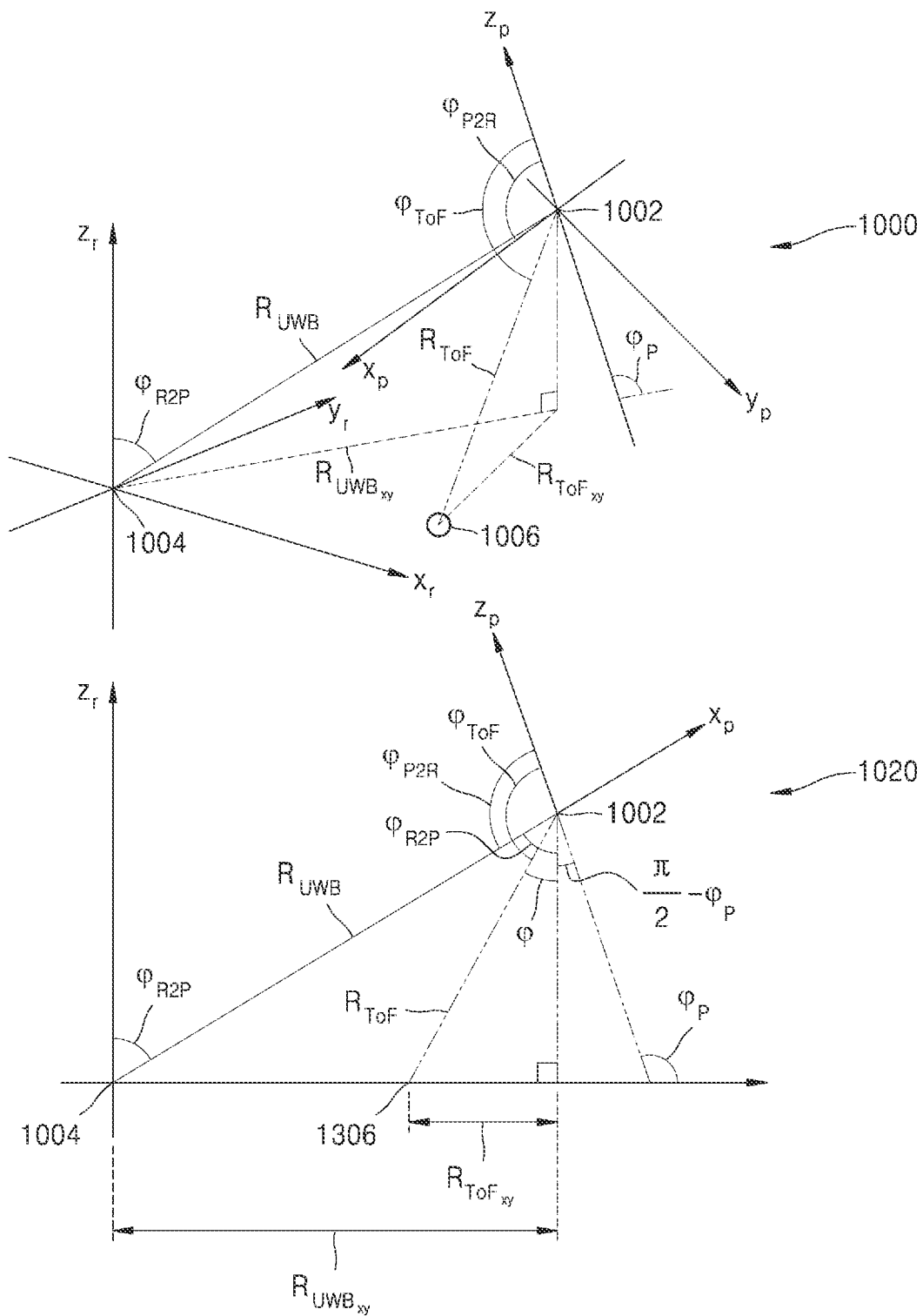
FIG. 10 is a diagram illustrating a process of determining distance information associated with an orthogonal projection onto a surface, on which a second electronic device is located, of a line segment associated with a distance between a first electronic device and the second electronic device and a line segment associated with a distance between the second electronic device and a target point according to an embodiment of the disclosure.

FIG. 10 is a diagram illustrating a process of determining distance information associated with an orthogonal projection onto a surface, on which a second electronic device is located, of a line segment associated with a distance between a first electronic device and the second electronic device and a line segment associated with a distance between the second electronic device and a target point according to an embodiment of the disclosure.

Referring to FIG. 10, it will be described based on a coordinate space 1000 illustrating a first electronic device 1002, a second electronic device 1004, and a target point 1006, on the assumption of the following. The z-axis of the second electronic device 1004 is perpendicular to the ground surface, and a positive direction of the z-axis of the first electronic device 1002 is opposite to the ground surface. The gradient $\varphi_p$ of the first electronic device 1002 is obtained through an acceleration sensor. The first electronic device 1002 obtains a direction vector to the target point 1006 through a ToF sensor.

The first electronic device 1002 may determine a first orthogonal projection distance $R_{UWB_{XY}}$ about an orthogonal projection onto a surface, on which the second electronic device is located, of a line segment associated with the distance $R_{UWB}$ between the first electronic device 1002 and the second electronic device 1004 as shown in Equation 1 based on the distance $R_{UWB}$ between the first electronic device 1002 and the second electronic device 1004 and the elevation angle $\varphi_{R2P}$ of the first electronic device 1002 with respect to the second electronic device 1004.

$$R_{UWB_{XY}} = R_{UWB}|\sin \varphi_{R2P}| = R_{UWB}|\cos(\varphi_{P2R} - \varphi_p)| \qquad \text{Equation 1}$$

Referring to a coordinate surface 1020 illustrating the first electronic device 1002, the second electronic device 1004, and the target point 1006, the elevation angle $\varphi_{R2P}$ of the first electronic device 1002 with respect to the second electronic device 1004 may be determined based on the elevation angle $\varphi_{P2R}$ of the second electronic device 1004 with respect to the first electronic device 1002 and the gradient $\varphi_p$ of the first electronic device 1002 as shown in Equations 2 and 3.

$$\frac{\pi}{2} - \varphi_p + \varphi_{R2P} + \varphi_{P2R} = \pi \qquad \text{Equation 2}$$

$$\varphi_{R2P} = \frac{\pi}{2} - (\varphi_{P2R} - \varphi_p) \qquad \text{Equation 3}$$

The first electronic device 1002 may determine a second orthogonal projection distance $R_{ToF_{XY}}$ about an orthogonal projection onto a surface, on which the target point 1006 is located, of a line segment associated with the distance $R_{ToF}$ between the first electronic device 1002 and the target point 1006 based on the distance $R_{ToF}$ between the first electronic device 1002 and the target point 1006 and the elevation angle $\varphi$ of the first electronic device 1002 with respect to the target point 1006. Selectively, the surface on which the target point 1006 is located and the surface on which the second electronic device 1004 is located may be the same as the ground surface.

$$R_{ToF_{XY}} = R_{ToF}|\sin(\varphi)| = R_{ToF}|\cos(\varphi_{ToF} - \varphi_p)| \qquad \text{Equation 4}$$

The elevation angle $\varphi$ of the first electronic device 1002 with respect to the target point 1006 may be determined as shown in Equations 5 and 6 based on an elevation angle $\varphi_{ToF}$ of the target point 1006 with respect to the first electronic device 1002.

$$\varphi_{ToF} + \varphi + \frac{\pi}{2} - \varphi_p = \pi \qquad \text{Equation 5}$$

$$\varphi = \frac{\pi}{2} - (\varphi_{ToF} - \varphi_p) \qquad \text{Equation 6}$$

Figure 11:
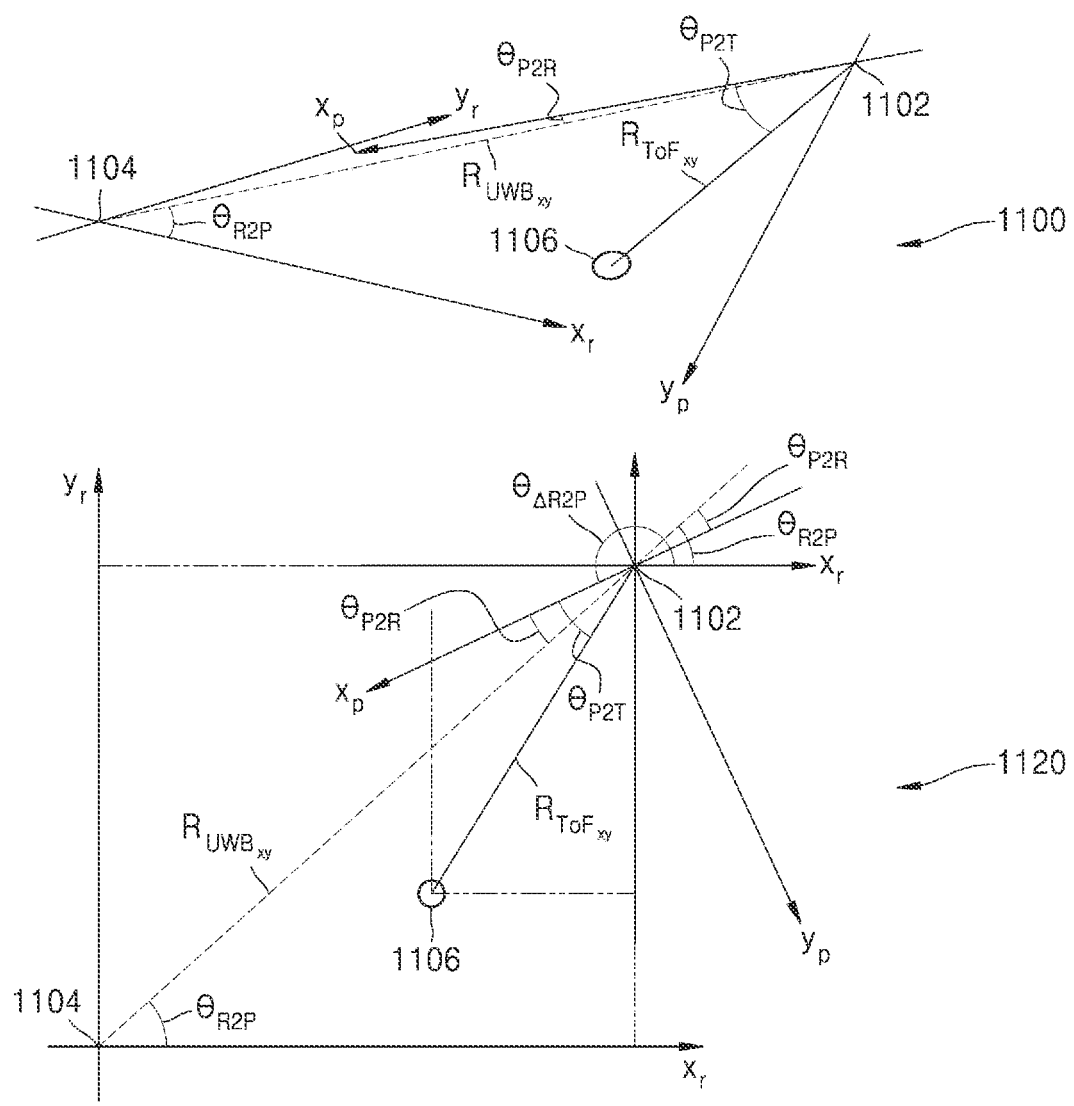
FIG. 11 is a diagram illustrating a process of determining coordinate information of a target point relative to a second electronic device according to an embodiment of the disclosure.

FIG. 11 is a diagram illustrating a process of determining coordinate information of a target point relative to a second electronic device according to an embodiment of the disclosure.

Referring to FIG. 11, all Z coordinates may have a value of '0' as shown in a coordinate space 1100 including an orthogonal projection 1102 onto a surface including a second electronic device 1104 of a point corresponding to a first electronic device, the second electronic device 1104, and a target point 1106. The point corresponding to the first electronic device may refer to an origin on first coordinate axes about the first electronic device.

Referring to a coordinate surface 1120 including the orthogonal projection 1102 onto the surface on which the second electronic device 1104 of the point corresponding to the first electronic device is located, the second electronic device 1104, and the target point 1106, the first electronic device may determine an angle $\theta_{\Delta R2P}$ formed between an x-axis $x_r$ of the second electronic device 1104 and an axis $x_p$ of the first electronic device based on the azimuth angle $\theta_{R2P}$ of the first electronic device with respect to the second electronic device 1104 and the azimuth angle $\theta_{P2R}$ of the second electronic device 1104 with respect to the first electronic device as shown in Equation 7.

$$\theta_{\Delta R2P} = \pi + (\theta_{R2P} - \theta_{P2R}) \qquad \text{Equation 7}$$

The first electronic device may determine an x coordinate $x_{R2T}$ of the target point 1106 relative to the second electronic device 1104 based on a first orthogonal projection distance $R_{UWB_{XY}}$, a second orthogonal projection distance $R_{ToF_{XY}}$, the angle $\theta_{\Delta R2P}$ between the x-axis $x_r$ of the second electronic device 1104 and the x-axis $x_p$ of the first electronic device, the azimuth angle $\theta_{P2T}$ of the target point 1106 with respect to the first electronic device, and the azimuth angle $\theta_{R2P}$ of the first electronic device with respect to the second electronic device 1104, as shown in Equation 8.

$$x_{R2T} = R_{UWB_{XY}} \cos(\theta_{R2P}) + R_{ToF_{XY}} \cos(\theta_{\Delta R2P} + \theta_{P2T}) \qquad \text{Equation 8}$$

The first electronic device may determine a y coordinate $y_{R2T}$ of the target point 1106 relative to the second electronic device 1104 based on the first orthogonal projection distance $R_{UWB_{XY}}$, the second orthogonal projection distance $R_{ToF_{XY}}$, the angle $\theta_{\Delta R2P}$ formed between the x-axis of the second electronic device 1104 and the x-axis of the first electronic device, the azimuth angle $\theta_{P2T}$ of the first electronic device with respect to the second electronic device 1104, and the azimuth angle $\theta_{R2P}$ of the first electronic device with respect to the second electronic device 1104, as shown in Equation 9.

$$y_{R2T} = R_{UWB_{XY}} \sin(\theta_{R2P}) + R_{ToF_{XY}} \sin(\theta_{\Delta R2P} + \theta_{P2T}) \qquad \text{Equation 9}$$

A distance $r_{R2T}$ of the target point 1106 from the second electronic device 1104 may be expressed as shown in Equation 10 based on the x coordinate $x_{R2T}$ and the y coordinate $y_{R2T}$ of the target point 1106 relative to the second electronic device 1104.

$$r_{R2T} = \sqrt{x_{R2T}^2 + y_{R2T}^2} \qquad \text{Equation 10}$$

The azimuth angle $\theta_{R2T}$ of the target point 1106 with respect to the second electronic device 1104 may be expressed as shown in Equation 11 based on the x coordinate $x_{R2T}$ and the y coordinate $y_{R2T}$ of the target point 1106 relative to the second electronic device 1104.

$$\theta_{R2T} = \cos^{-1} \frac{x_{R2T}}{r_{R2T}} \qquad \text{Equation 11}$$

The elevation angle $\varphi_{R2T}$ of the target point 1106 with respect to the second electronic device 1104 may have a value of '0' as shown in Equation 12.

$$\varphi_{R2T} = 0 \qquad \text{Equation 12}$$

Figure 12:
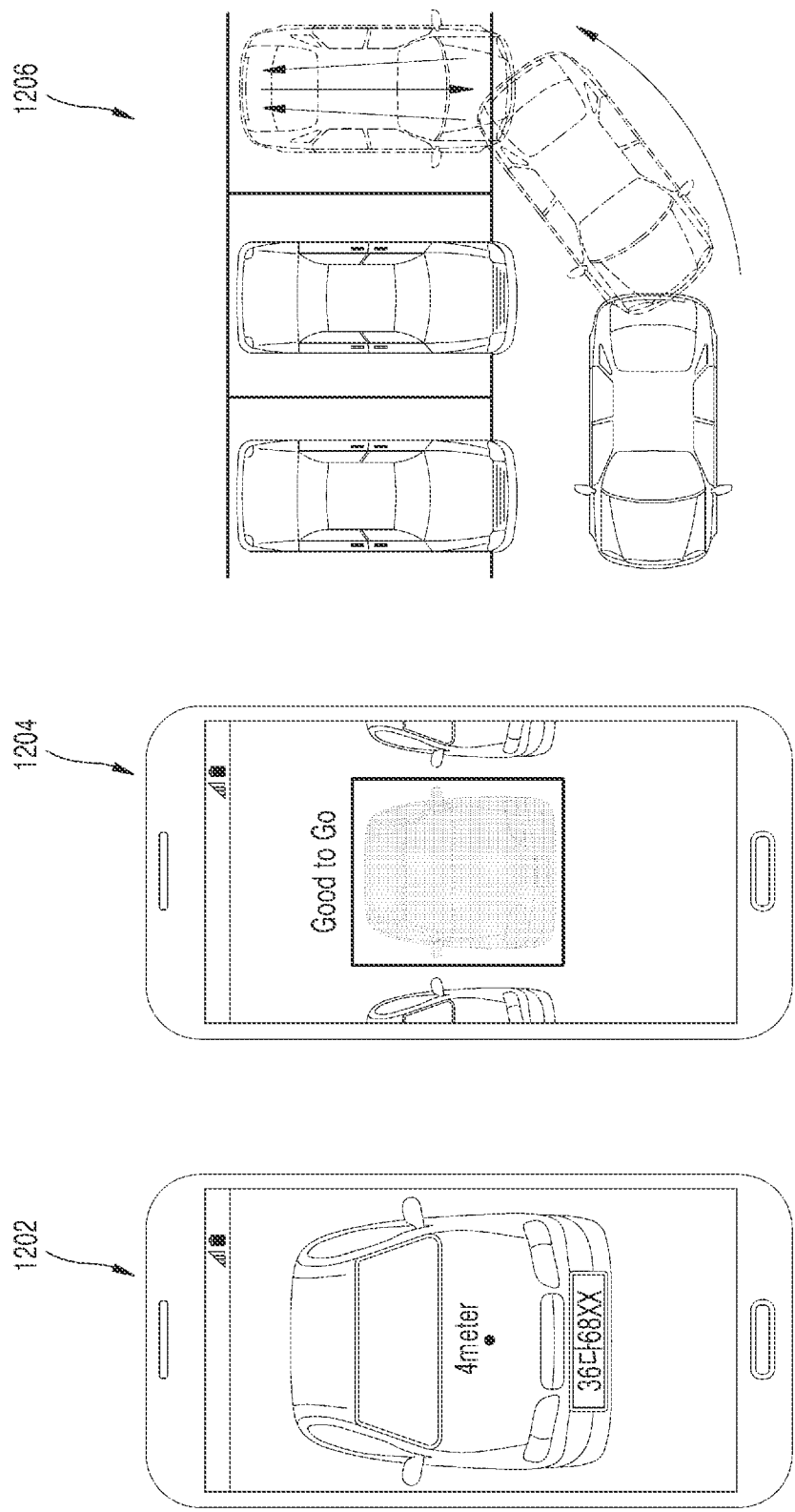
FIG. 12 is a diagram illustrating a process by which a second electronic device identified by a first electronic device performs an operation associated with a target point, according to an embodiment of the disclosure.

FIG. 12 is a diagram illustrating a process by which a second electronic device identified by a first electronic device performs an operation associated with a target point, according to an embodiment of the disclosure.

Referring to FIG. 12, a user may locate a first electronic device 1202 to face a second electronic device selected by the user. For example, the user may locate the first electronic device 1202 so that a camera of the first electronic device 1202 captures an image of the second electronic device selected by the user. The first electronic device 1202 may measure a distance to the second electronic device selected by the user through an optical signal, and may measure a distance to a distance to each of a plurality of electronic devices performing UWB communication with the first electronic device 1202 through a UWB signal. The first electronic device 1202 may identify an electronic device in which a difference between the distance between the first electronic device 1202 and each of the electronic devices measured via the UWB signal from among the plurality of electronic devices and the distance between the first electronic device 1202 and the second electronic device selected by the user measured through the optical signal is less than a threshold value, as the second electronic device selected by the user.

The first electronic device 1202 may display identification information about the identified second electronic device on a screen. For example, when the first electronic device 1202 is a smartphone and the second electronic device is a vehicle, the first electronic device 1202 may display a front view of the vehicle and a license plate on the screen of the smartphone, and may determine whether the vehicle displayed to the user is the same as the second electronic device selected by the user.

After the user responds that the second electronic device identified 1204 by the first electronic device 1202 is the same as the second electronic device selected by the user, the user may locate the first electronic device 1202 to face the target point. The first electronic device 1202 may determine (1206) whether the second electronic device may move to the target point based on physical information of the second electronic device and physical information about a space corresponding to the target point. For example, the physical information about the second electronic device may include a size and a height of the vehicle, and the physical information about the space corresponding to the target point may include a size of a parking space. The first electronic device 1202 may notify the user of whether the second electronic device is movable to the target point through the screen.

Figure 13:
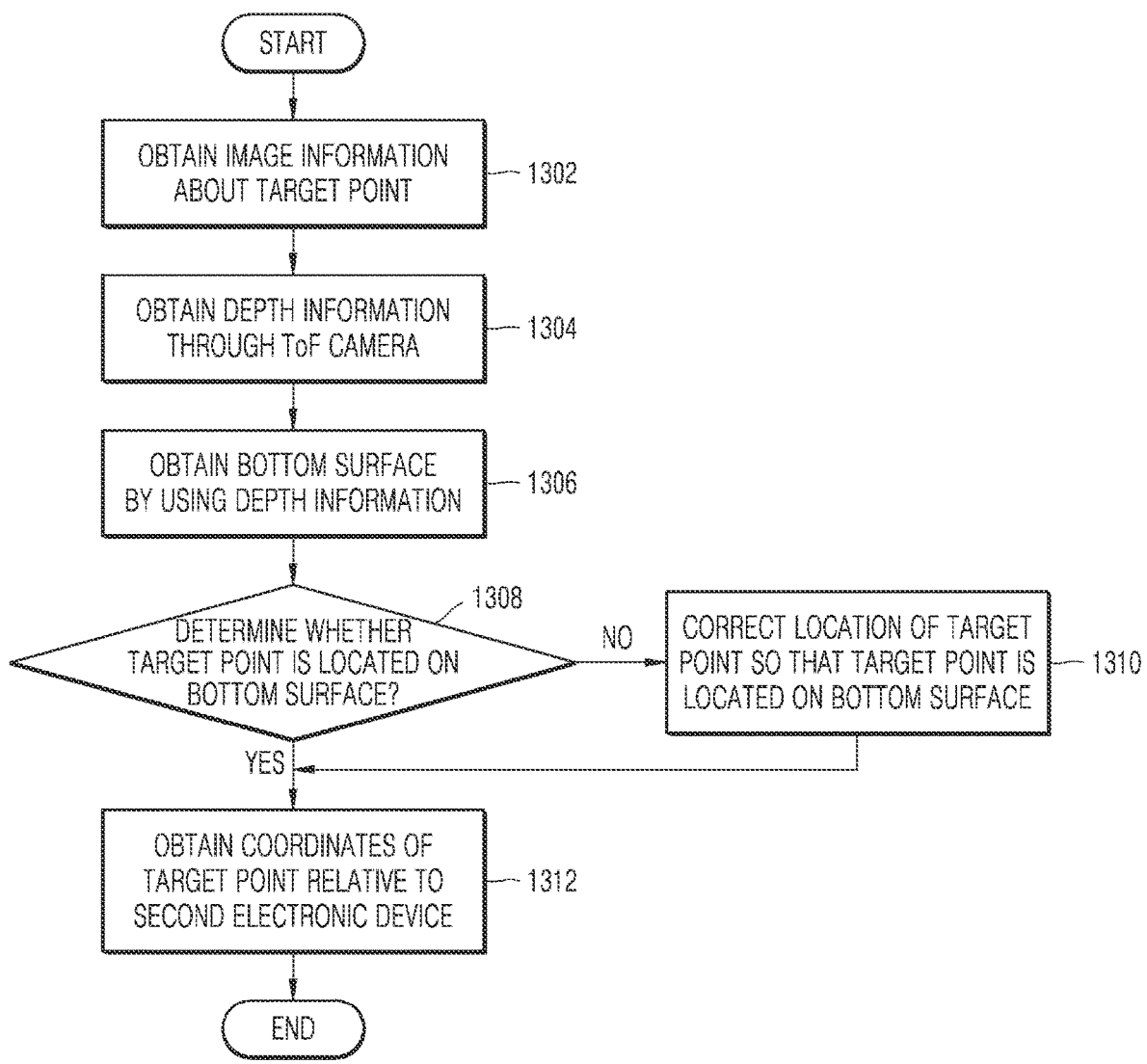
FIG. 13 is a flowchart illustrating a process by which a first electronic device corrects a location of a target point when the target point is covered by an obstacle, according to an embodiment of the disclosure.

FIG. 13 is a flowchart illustrating a process by which a first electronic device corrects a location of a target point when the target point is covered by an obstacle, according to an embodiment of the disclosure.

When there is an obstacle between a first electronic device and a target point, it is difficult to obtain an accurate location of the target point relative to a second electronic device by using only ToF technology. Based on the fact that the target point should be located on the same surface as a bottom surface on which the second electronic device is located, when a surface on which the target point is located is not the same as the bottom surface on which the second electronic device is located, the first electronic device may correct a location of the target point.

According to an embodiment of the disclosure, a first electronic device may obtain information about a bottom surface on which a second electronic device is located even when a target point is covered by an obstacle and is invisible to the first electronic device by using ToF technology and gradient information of the first electronic device obtained through an acceleration sensor. The first electronic device may determine a more accurate location of the target point relative to the second electronic device by correcting a location of the target point so that the target point is located on the bottom surface based on the obtained information about the bottom surface Referring to FIG. 13, at operation 1302, a first electronic device may obtain an image of a target point. For example, a user may locate a camera of a mobile phone to face the target point, and may obtain an image of the target point through the camera. The user may select an area corresponding to the target point on a screen of the mobile phone based on the image of the target point.

At operation 1304, the first electronic device may obtain depth information through a ToF camera. The depth information indicates a 3D image generated by calculating a 3D depth value of each pixel of the image. For example, the ToF camera may determine the depth information by obtaining travel time information by measuring a delay or phase shift of a modulated optical signal for all pixels of a scene.

At operation 1306, the first electronic device may obtain information about a bottom surface on which a second electronic device is located by using the depth information. Because the second electronic device generally moves on the bottom surface, it is described for convenience of explanation that the second electronic device is located on the bottom surface, but a surface on which the second electronic device is located is not limited to the bottom surface.

At operation 1308, the first electronic device may determine whether the target point is located on the bottom surface based on the depth information. For example, when there is an obstacle between the target point and the first electronic device, the first electronic device may determine that the target point is located on the obstacle. The first electronic device may determine whether the target point is located on the surface on which the second electronic device is located by considering a type of the second electronic device. Because the second electronic device is not necessarily located on the bottom surface as described above, the second electronic device may not be located on the bottom surface according to a type of the second electronic device. Accordingly, the first electronic device may determine the surface on which the second electronic device is located by considering a type of the second electronic device, and may determine whether the target point is located on the determined surface.

At operation 1310, when the target point is not located on the bottom surface ('no' at operation 1308), the first electronic device may correct a location of the target point so that the target point is located on the bottom surface. When the target point is located on the bottom surface ('yes' at operation 1308), the first electronic device may not separately correct the location of the target point.

At operation 1312, the first electronic device may obtain coordinates of the target point relative to the second electronic device. For example, the first electronic device may determine location information of the target point relative to the second electronic device according to a method described with reference to FIGS. 8 to 11.

Figure 14A:
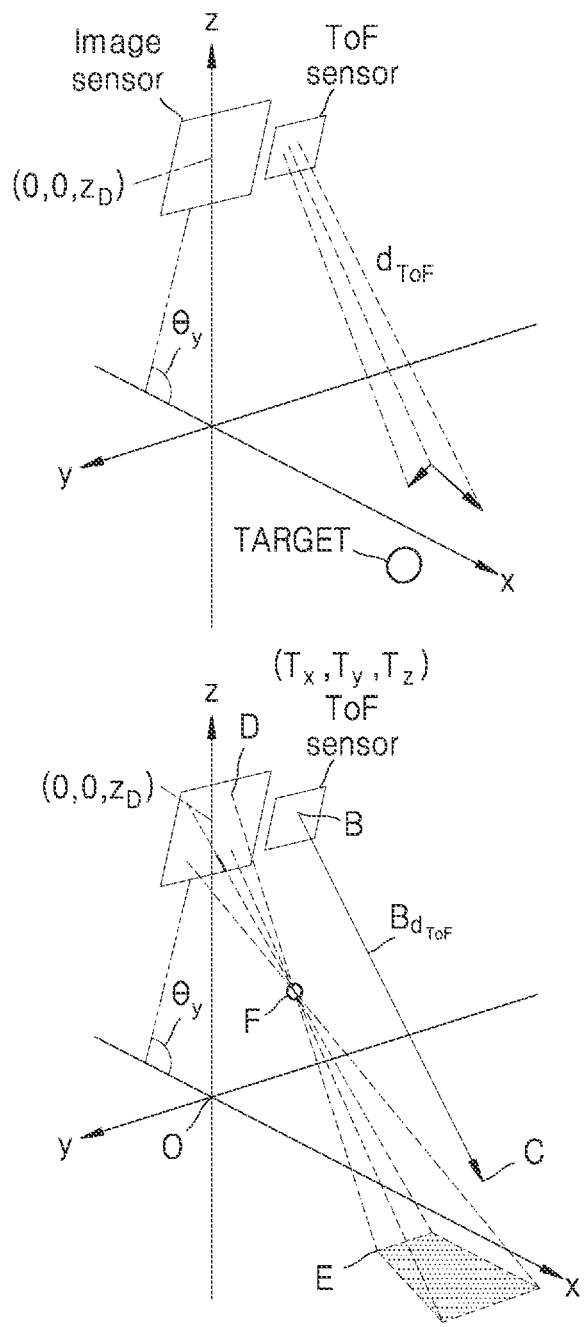
FIG. 14A is a diagram illustrating a process by which a first electronic device obtains a surface on which a second electronic device is located, according to an embodiment of the disclosure.

FIG. 14A is a diagram illustrating a process by which a first electronic device obtains a surface on which a second electronic device is located, according to an embodiment of the disclosure.

Referring to FIG. 14A, a first electronic device may include an image sensor for obtaining an image of a target point, and a ToF sensor for measuring a distance between the first electronic device and the target point and obtaining depth information about the target point by using ToF technology.

The first electronic device may obtain information about a bottom surface based on the center of the image sensor. For convenience of explanation, the following will be described assuming that the center of the image sensor is $(0,0,z_D)$.

The first electronic device may determine a rotation angle $\theta_y$ with respect to the y-axis of the first electronic device and a rotation angle $\theta_x$ with respect to the x-axis of the first electronic device based on a y-axis acceleration $a_y$ of the first electronic device, an x-axis acceleration $a_x$ of the first electronic device, and a gravity acceleration g obtained by using an acceleration sensor as shown in Equations 13 and 14.

$$\theta_y = \frac{\pi}{2} - \cos^{-1}\frac{-a_y}{|g|\,|1|} \qquad \text{Equation 13}$$

$$\theta_x = \frac{\pi}{2} - \cos^{-1}\frac{-a_x}{|g|\,|1|} \qquad \text{Equation 14}$$

As described at operation 1302 of FIG. 13, a user may select an area corresponding to the target point on a screen of a mobile phone based on the image of the target point. The selected area corresponding to the target point may include an area corresponding to the bottom surface. Hereinafter, an area included in a target area and corresponding to the bottom surface is referred to as a target area. The first electronic device may arbitrarily select a first point, a second point, and a third point from among points included in the target area. The first electronic device may determine a point B corresponding to the first point from among points included in the ToF sensor.

When the center of the image sensor is an origin (0,0,0), the first electronic device may determine a first relative location indicating coordinates of a point corresponding to the first point from among the points included in the ToF sensor. When the center of the image sensor is located at the origin (0,0,0), coordinates $(B_x, B_y, B_z)$ of the first relative location refer to a point on the ToF sensor corresponding to an arbitrary point indicating the bottom surface in the area corresponding to the target point selected by the user.

The first electronic device may determine a point corresponding to the first point on the ToF sensor by considering the first relative location and an actual height and a gradient of the first electronic device. The first electronic device may determine a second relative location about the point B corresponding to the first point from among the points on the ToF sensor based on the coordinates $(B_x, B_y, B_z)$ of the first relative location, the rotation angle $\theta_y$ with respect to the y-axis of the first electronic device, the rotation angle $\theta_x$ with respect to the x-axis of the first electronic device, and the z coordinate $z_D$ of the center of the image sensor. For example, the first electronic device may determine coordinates $(B'_x, B'_y, B'_z)$ of the second relative location. The second relative location B refers to a location of the center of the ToF sensor relative to the center of the image sensor considering that the first electronic device rotates about the x and y-axes and moves parallel to the z-axis, and may be determined as shown in Equation 15.

$$(B'_x, B'_y, B'_z) = (B_x\cos(\theta_x)\cos(\theta_y) + B_y\sin(\theta_x)\cos(\theta_y) - B_z\sin(\theta_y), -B_x\sin(\theta_x) + B_y\cos(\theta_x), B_x\cos(\theta_x)\sin(\theta_y) + B_y\sin(\theta_x)\sin(\theta_y) + B_z\cos(\theta_y) + z_D) \qquad \text{Equation 15}$$

The first electronic device may determine the z coordinate $z_D$ of the center of the image sensor through Equations 16 and 15.

$$B'_z = |B_{vz} B_{d_{ToF}}| \qquad \text{Equation 16}$$

The first electronic device may determine the z coordinate $z_D$ of the center of the image sensor according to a z-axis coordinate $B'_z$ of the second relative location B determined based on a unit vector $B_{v'z}$ in a z-axis direction of the point B indicating the second relative location and a distance $B_{d_{ToF}}$ from the point B indicating the second relative location to a point C on the bottom surface corresponding to the second relative location B as shown in Equation 16 and the z-axis coordinate $B'_z$ of the point B indicating the second relative location determined based on the coordinates $(B_x, B_y, B_z)$ of the first relative location, the rotation angle $\theta_y$ with respect to the y-axis of the first electronic device, the rotation angle $\theta_x$ with respect to the x-axis of the first electronic device, and the z coordinate $z_D$ of the center of the image sensor as shown in Equation 15. For example, the point C on the bottom surface corresponding to the point B indicating the second relative location refers to a point on the bottom surface which a ToF signal output from the second relative location B reaches.

The first electronic device may determine coordinates $(C_x, C_y, C_z)$ of the point C on the bottom surface corresponding to the second relative location B based on the unit vector $(B_{v'x}, B_{v'y}, B_{v'z})$ to the second relative location B, the coordinates $(B'_x, B'_y, B'_z)$ of the second relative location B, and the distance $B_{d_{ToF}}$ from the second relative location B to the point C on the bottom surface corresponding to the second relative location B, as shown in Equation 17.

$$(C_x, C_y, C_z) = (B_{v'x} B_{d_{ToF}} + B'_x, B_{v'y} B_{d_{ToF}} + B'_y, B_{v'z} B_{d_{ToF}} + B'_z) \qquad \text{Equation 17}$$

The unit vector $(B_{v'x}, B_{v'y}, B_{v'z})$ of the second relative location B may be determined as shown in Equation 18 based on a unit vector $(B_{vx}, B_{vy}, B_{vz})$ of the first relative location, the rotation angle $\theta_y$ with respect to the y-axis of the first electronic device, and the rotation angle $\theta_x$ with respect to the x-axis of the first electronic device.

$$(B_{v'x}, B_{v'y}, B_{v'z}) = (B_{vx}\cos(\theta_x)\cos(\theta_y) + B_{vy}\sin(\theta_x)\cos(\theta_y) - B_{vz}\sin(\theta_y), -B_{vx}\sin(\theta_x) + B_{vy}\cos(\theta_x), B_{vx}\cos(\theta_x)\sin(\theta_y) + B_{vy}\sin(\theta_x)\sin(\theta_y) + B_{vz}\cos(\theta_y)) \qquad \text{Equation 18}$$

The unit vector $(B_{vx}, B_{vy}, B_{vz})$ of the first relative location refers to a direction in which an optical signal is output from the ToF sensor at the first relative location, and the unit vector $(B_{v'x}, B_{v'y}, B_{v'z})$ of the second relative location B refers to a direction in which an optical signal is output from the ToF sensor at the second relative location B.

After obtaining the coordinates $(C_x, C_y, C_z)$ of the point C on the bottom surface corresponding to the second relative location B, the first electronic device may additionally obtain coordinates of two points on the bottom surface respectively corresponding to the second point and the third point in the same manner. The first electronic device may obtain two vectors on the bottom surface based on coordinates of three points on the bottom surface. The first electronic device may obtain a normal vector $(f_x, f_y, f_z)$ perpendicular to the two vectors on the bottom surface, and then may obtain information about the bottom surface by determining a plane passing through the origin and having the obtained normal vector $(f_x, f_y, f_z)$ as shown in Equation 19.

$$f_x x + f_y y + f_z z = 0 \qquad \text{Equation 19}$$

Figure 14B:
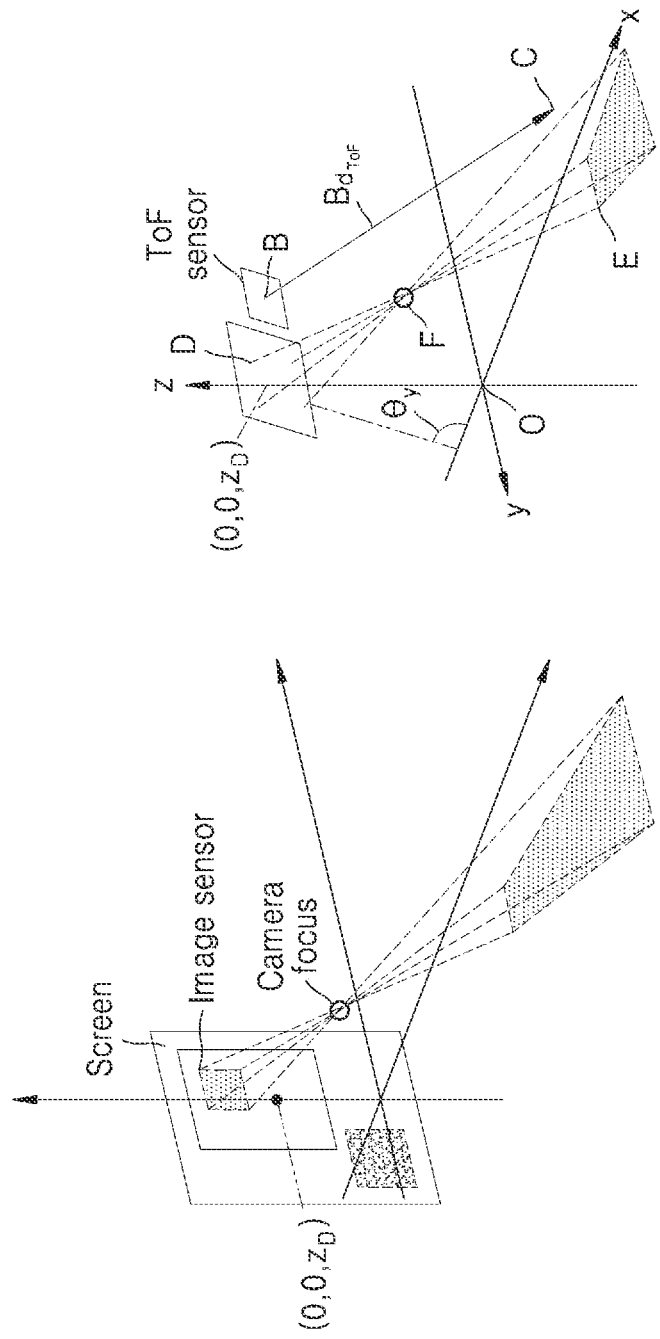
FIG. 14B is a diagram illustrating a process by which a first electronic device corrects an area corresponding to a target point to a location of a bottom surface, according to an embodiment of the disclosure.

FIG. 14B is a diagram illustrating a process by which a first electronic device corrects an area corresponding to a target point to a location of a bottom surface, according to an embodiment of the disclosure.

Referring to FIG. 14B, a first electronic device may determine whether an area selected by a user is located on a bottom surface based on obtained information about the bottom surface. When the area selected by the user is not located on the bottom surface, the first electronic device may correct the selected area to a location of the bottom surface. Although the area selected by the user has a square shape for convenience of explanation, a shape of the area selected by the user is not limited thereto.

When the center of an image sensor is $(0, 0, z_D)$, the first electronic device may determine information about an area corresponding to the area selected by the user on the bottom surface. The area selected by the user may include a target point whose image is captured by the image sensor. The first electronic device may determine vertexes constituting the area selected by the user on the image sensor. For example, the first electronic device may determine a first vertex, a second vertex, a third vertex, and a fourth vertex constituting the area selected by the user. The first electronic device may determine four points corresponding to the first vertex through the fourth vertex on the bottom surface, and may determine an area on the bottom surface corresponding to the area selected by the user based on the determined four points.

The first electronic device may determine an equation for a straight line determined by the first vertex D and a focus F of the image sensor as shown in Equation 20. Selectively, coordinates of the first vertex D may be $(D'_x, D'_y, D'_z)$, and the focus F of the image sensor may be $(F'_x, F'_y, F'_z)$.

$$\frac{x - D'_x}{F'_x - D'_x} = \frac{y - D'_y}{F'_y - D'_y} = \frac{z - D'_z}{F'_z - D'_z} \qquad \text{Equation 20}$$

The first electronic device may determine a point E on the bottom surface corresponding to the first vertex D by determining an intersection between the straight line determined through Equation 20 and the bottom surface determined through Equation 19. Coordinates $(x_1, y_1, z_1)$ of the point E on the bottom surface corresponding to the first vertex D may be determined as shown in Equation 21.

$$(x_1, y_1, z_1) = \begin{pmatrix} \dfrac{D'_x \{f_y(F'_y - D'_y) + f_z(F'_z - D'_z)\} - (F'_x - D'_x)(f_y D'_y + f_z D'_z)}{f_x(F'_x - D'_x) + f_y(F'_y - D'_y) + f_z(F'_z - D'_z)}, \\[6pt] \dfrac{D'_y \{f_x(F'_x - D'_x) + f_z(F'_z - D'_z)\} - (F'_y - D'_y)(f_x D'_x + f_z D'_z)}{f_x(F'_x - D'_x) + f_y(F'_y - D'_y) + f_z(F'_z - D'_z)}, \\[6pt] \dfrac{D'_z \{f_x(F'_x - D'_x) + f_y(F'_y - D'_y)\} - (F'_z - D'_z)(f_x D'_x + f_y D'_y)}{f_x(F'_x - D'_x) + f_y(F'_y - D'_y) + f_z(F'_z - D'_z)} \end{pmatrix} \quad \text{Equation 21}$$

The coordinates $D'_x$, $D'_y$, $D'_z$ of the first vertex D may be determined as shown in Equation 22.

$$D'_x, D'_y, D'_z) = (D_x \cos(\theta_x)\cos(\theta_y) + D_y \sin(\theta_x)\cos(\theta_y) - D_z \sin(\theta_y), -D_x \sin(\theta_x) + D_y \cos(\theta_x), D_x \cos(\theta_x)\sin(\theta_y) + D_y \sin(\theta_x)\sin(\theta_y) + D_z \cos(\theta_y) + z_D) \qquad \text{Equation 22}$$

As described above, $\theta_y$ denotes a rotation angle with respect to the y-axis of the first electronic device, and $\theta_x$ denotes a rotation angle with respect to the x-axis of the first electronic device. In addition, when the center of the image sensor is the origin $(0,0,0)$, $D_x$, $D_y$, $D_z$ may be relative coordinates indicating the first vertex of the area selected by the user on the image sensor.

The first electronic device may determine the remaining points on the bottom surface corresponding to the second vertex, the third vertex, and the fourth vertex in the same manner, and may correct an area corresponding to the target point to a location of the bottom surface based on the determined points on the bottom surface.

FIG. 15 is a diagram illustrating a process by which a first electronic device determines a location of a target point relative to a second electronic device based on a UWB signal and an acceleration sensor, according to an embodiment of the disclosure.

According to an embodiment of the disclosure, a first electronic device may use only UWB-related technology without using ToF technology, and thus may determine location information about a target point without being affected by light around the target point or a color of a bottom surface.

Referring to FIG. 15, to a coordinate surface 1500 illustrating a first electronic device 1502 and a second electronic device 1504, the first electronic device 1502 may obtain the distance $R_{UWB}$ between the first electronic device 1502 and the second electronic device 1504 by using UWB ranging technology. The first electronic device 1502 may obtain an elevation angle $\varphi_{UWB}$ of the second electronic device 1504 with respect to the first electronic device 1502 by using AoA technology based on UWB. The first electronic device 1502 may obtain the gradient $\varphi_p$ of the first electronic device 1502 by using an acceleration sensor. The first electronic device 1502 may determine a height h 1508 of the first electronic device 1502 from a surface on which the second electronic device 1504 is located as shown in Equation 23 based on the distance $R_{UWB}$ between the first electronic device 1502 and the second electronic device 1504, the elevation angle $\varphi_{UWB}$ of the second electronic device 1504 with respect to the first electronic device 1502, and the gradient $\varphi_p$ of the first electronic device 1502.

$$h = R_{UWB} * \sin(\varphi_p + \varphi_{UWB} - \pi) \qquad \text{Equation 23}$$

Referring to a coordinate surface 1520 illustrating the first electronic device 1502 and a target point 1506, the first electronic device 1502 may determine, as shown in Equation 24, a distance 1512 from the target point 1506 to a point corresponding to an orthogonal projection onto a surface, on which the target point 1506 is located, of a point corresponding to the first electronic device 1502 based on the height 1508 of the first electronic device 1502 and the gradient $\varphi_p$ of the first electronic device 1502.

$$R_{UWB} * \sin(\varphi_p + \varphi_{UWB} - \pi) * \tan(\pi - \varphi_p) \qquad \text{Equation 24}$$

According to an embodiment of the disclosure, because the first electronic device 1502 may determine the distance 1512 from the target point 1506 to the point corresponding to the orthogonal projection onto the surface, on which the target point 1506 is located, of the point corresponding to the first electronic device 1502 without using ToF technology, a decrease in the accuracy of distance information about the target point 1506 due to natural light may be prevented.

Figure 16:
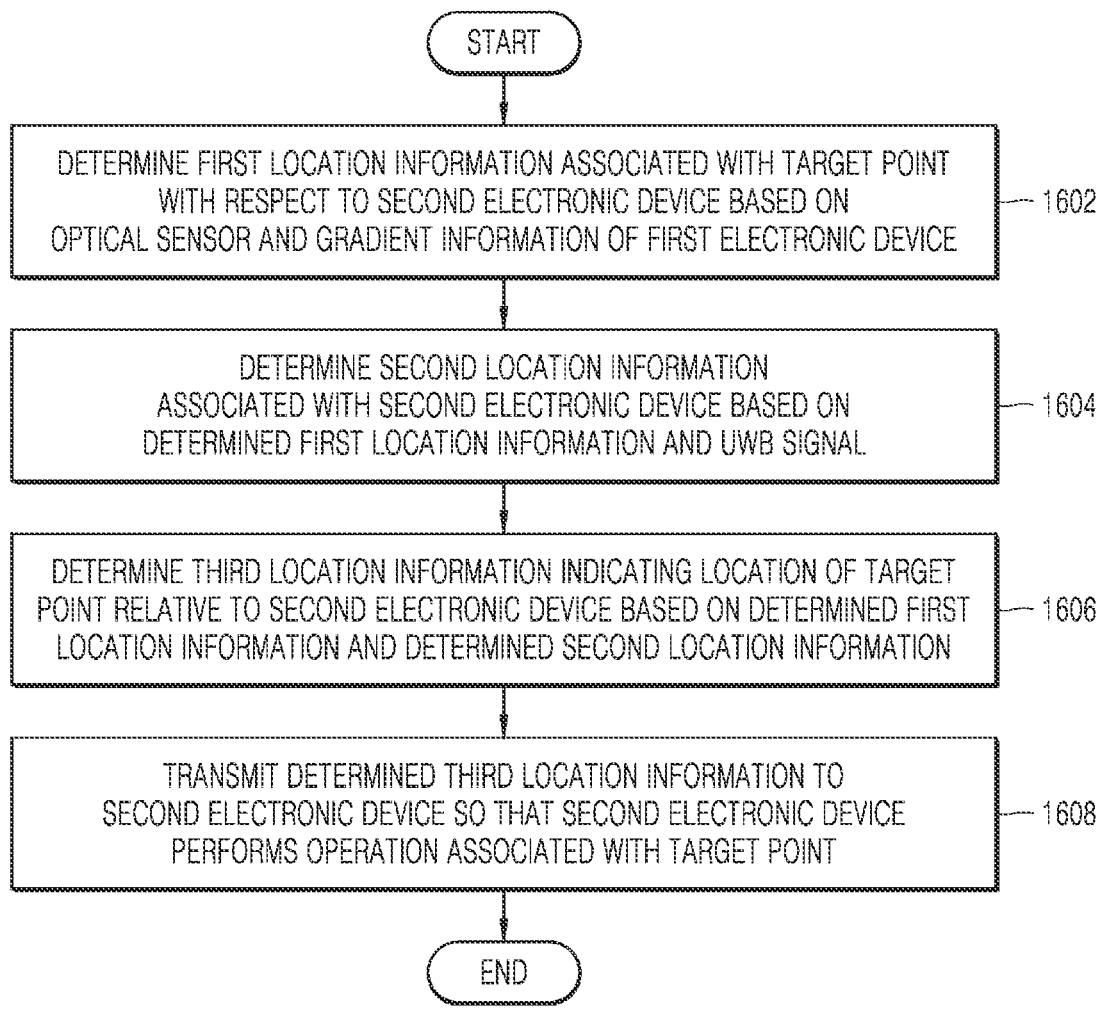
FIG. 16 is a flowchart illustrating an operating method of a first electronic device, according to an embodiment of the disclosure.

FIG. 16 is a flowchart illustrating an operating method of a first electronic device, according to an embodiment of the disclosure.

Referring to FIG. 16, at operation 1602, a first electronic device may determine first location information of the first electronic device associated with a target point based on an optical signal and gradient information of the first electronic device. The target point may indicate a location to which a second electronic device is to move.

According to an embodiment of the disclosure, when an obstacle is located between the first electronic device and the target point, the first electronic device may determine the first location information by correcting a location of the target point. The first electronic device may obtain information about a surface on which the second electronic device is located based on an optical sensor and the gradient information. When the target point is not located on the surface on which the second electronic device is located, the first electronic device may correct the location of the target point so that the target point is located on the surface on which the second electronic device is located.

The first electronic device may obtain a distance between the first electronic device and the target point by using an optical sensor. The first electronic device may obtain a gradient of the first electronic device through an acceleration sensor. The first electronic device may determine an elevation angle of the first electronic device with respect to the target point based on the gradient of the first electronic device. The first electronic device may determine a height of the first electronic device from the surface on which the second electronic device is located based on the distance between the first electronic device and the target point and the elevation angle of the first electronic device with respect to the target point.

At operation 1604, the first electronic device may determine second location information associated with the second electronic device based on the first location information and a UWB signal. For example, the first electronic device may obtain a distance between the first electronic device and the second electronic device based on the UWB signal. The first electronic device may determine an elevation angle of the first electronic device with respect to the second electronic device based on the height of the first electronic device from a surface on which the target point is located and the distance between the first electronic device and the second electronic device.

At operation 1606, the first electronic device may determine third location information indicating a location of the target point relative to the second electronic device based on the first location information and the second location information. For example, the first electronic device may determine a distance about an orthogonal projection onto the surface, on which the second electronic device is located, of a line segment associated with the distance between the first electronic device and the second electronic device based on the elevation angle of the first electronic device with respect to the second electronic device. In addition, the first electronic device may determine a distance about an orthogonal projection onto the surface, on which the second electronic device is located, of a line segment associated with the distance between the first electronic device and the target point based on the gradient information and an elevation angle of the target point with respect to the first electronic device.

The first electronic device may determine an azimuth angle of the first electronic device with respect to the second electronic device. The first electronic device may determine an azimuth angle of the second electronic device with respect to the first electronic device. The first electronic device may determine an azimuth angle of the target point with respect to the first electronic device. The first electronic device may determine coordinates of the target point relative to the second electronic device based on the distance about the orthogonal projection onto the surface, on which the second electronic device is located, of the line segment associated with the distance between the first electronic device and the second electronic device, the distance about the orthogonal projection onto the surface, on which the second electronic device is located, of the line segment associated with the distance between the first electronic device and the target point, the azimuth angle of the first electronic device with respect to the second electronic device, the azimuth angle of the second electronic device with respect to the first electronic device, and the azimuth angle of the target point with respect to the first electronic device.

According to an embodiment of the disclosure, the first electronic device may correct the azimuth angle of the first electronic device with respect to the second electronic device and the azimuth angle of the second electronic device with respect to the first electronic device based on the elevation angle of the second electronic device with respect to the first electronic device and the elevation angle of the first electronic device with respect to the second electronic device obtained via the UWB signal.

According to an embodiment of the disclosure, the first electronic device may identify the second electronic device selected by a user from among one or more electronic devices performing UWB-based communication with the first electronic device based on the optical sensor and one or more UWB signals. The first electronic device may determine a distance between the first electronic device and the second electronic device determined by the user via the optical sensor. The first electronic device may determine a distance between the first electronic device and each of the plurality of electronic devices via the one or more UWB signals. The first electronic device may identify the second electronic device from among the one or more electronic devices based on the distance between the first electronic device and the second electronic device selected by the user determined via the optical sensor and the distance between the first electronic device and each of the one or more electronic devices determined via the one or more UWB signals.

At operation 1608, the first electronic device may transmit the determined third location information to the second electronic device so that the second electronic device performs an operation associated with the target point.

Figure 17:
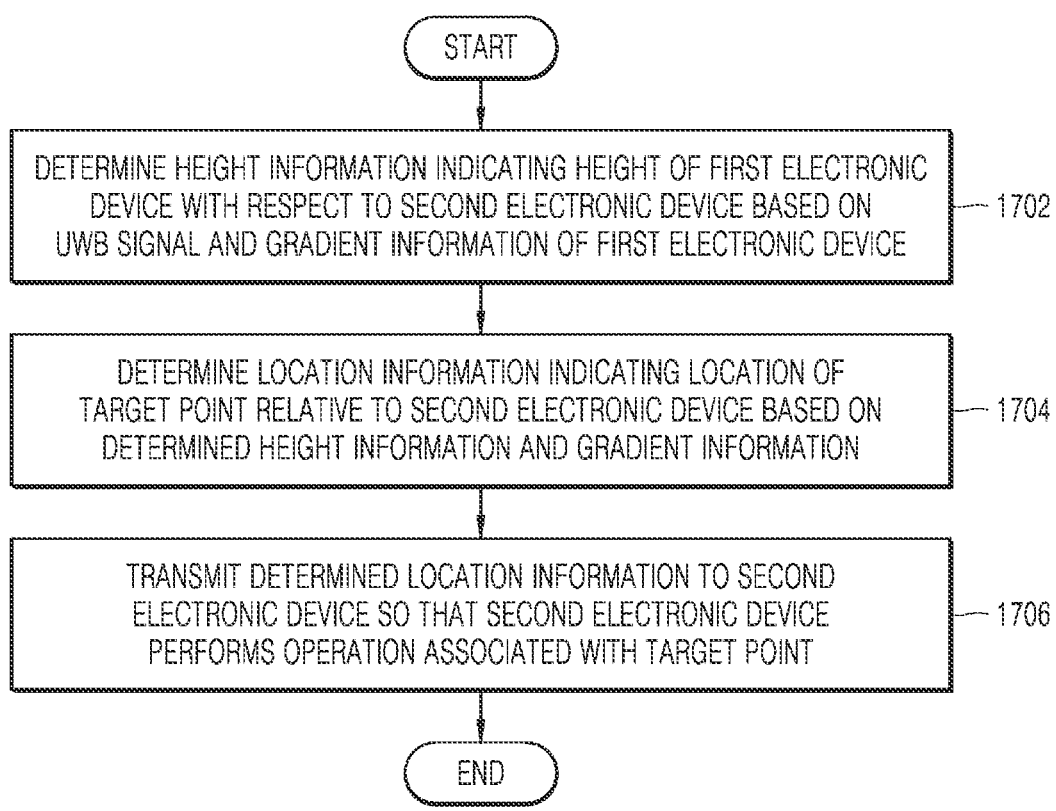
FIG. 17 is a flowchart illustrating an operating method of a first electronic device, according to an embodiment of the disclosure.

FIG. 17 is a flowchart illustrating an operating method of a first electronic device, according to an embodiment of the disclosure.

Referring to FIG. 17, at operation 1702, a first electronic device may determine height information indicating a height of the first electronic device with respect to a second electronic device based on a UWB signal and gradient information of the first electronic device. The first electronic device may determine first distance information indicating a distance between the first electronic device and the second electronic device via the UWB signal. The first electronic device may determine first angle information indicating an elevation angle of the second electronic device with respect to the first electronic device via the UWB signal. The first electronic device may determine second angle information indicating an elevation angle of the first electronic device with respect to the second electronic device based on the gradient information and the determined first angle information. The first electronic device may determine the height information based on the determined second angle information and the determined first distance information.

At operation 1704, the first electronic device may determine location information indicating a location of a target point relative to the second electronic device based on the determined height information and the gradient information. For example, the first electronic device may determine second distance information associated with an orthogonal projection onto a surface, on which the target point is located, of a line segment associated with a distance between the first electronic device and the target point based on the height information and the gradient information. The first electronic device may determine coordinates of the target point relative to the second electronic device based on the determined second distance information.

At operation 1706, the first electronic device may transmit the determined location information determined to the second electronic device so that the second electronic device performs an operation associated with the target point. Because the first electronic device obtains location information about the second electronic device and the target point by using only the UWB signal, the first electronic device may transmit the location information of the target point relative to the second electronic device to the second electronic device without being affected by light around the target point or a color.

Figure 18:
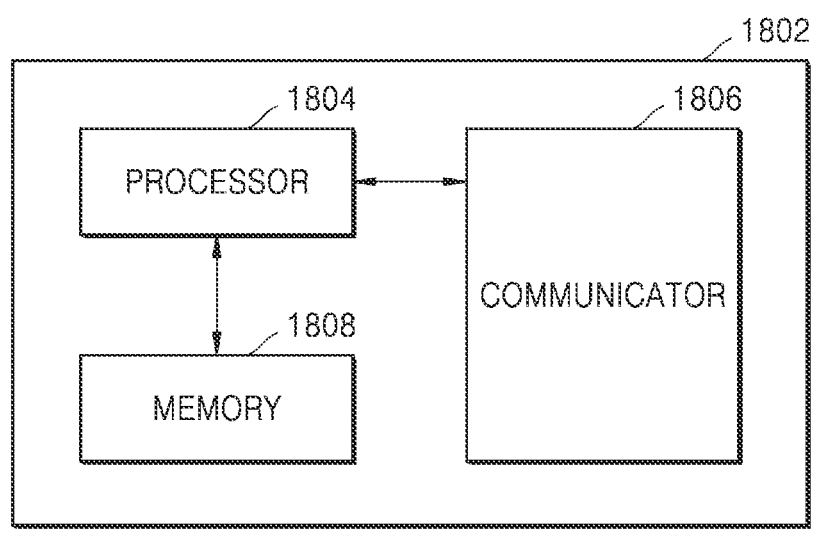
FIG. 18 is a block diagram illustrating a first electronic device, according to an embodiment of the disclosure.

FIG. 18 is a block diagram of a first electronic device, according to an embodiment of the disclosure.

Referring to FIG. 18, a first electronic device 1802 may include a processor 1804, a communicator 1806, and a memory 1808. However, the first electronic device 1802 may include more or fewer elements than those illustrated in FIG. 18.

Although the first electronic device 1802 includes one processor in FIG. 18, an embodiment of the disclosure is not limited thereto, and the first electronic device 1802 may include a plurality of processors. At least some of operations and functions of the processors 1804 may be performed by the plurality of processors. The first electronic device 1802 of FIG. 18 may perform an operating method according to various embodiments of the disclosure, and descriptions of FIGS. 1 to 13, 14A, 14B, 15, 16, and 17 may be applied.

The communicator 1806 according to an embodiment of the disclosure may perform wired/wireless communication with another device or a network. To this end, the communicator 1806 may include a communication module supporting at least one of various wired/wireless communication methods. For example, the communication module may be a chipset, or may be a sticker/barcode (e.g., a sticker with a near-field communication (NFC) tag) storing information necessary for communication.

The wireless communication may include, for example, at least one of cellular communication, wireless fidelity (Wi-Fi), Wi-Fi Direct, Bluetooth, UWB, or near-field communication (NFC). The wired communication may include, for example, at least one of universal serial bus (USB) or high-definition multimedia interface (HDMI).

In an embodiment of the disclosure, the communicator 1806 may include a communication module for short-range communication. For example, the communicator 1806 may include a communication module for performing various short-range communication, such as infrared communication, magnetic secure transmission (MST), and magnetic secure communication in addition to UWB, Wi-Fi, Wi-Fi Direct, Bluetooth, and NFC.

The communicator 1806 according to an embodiment of the disclosure may communicate with a second electronic device by using a first communication method or a second communication method. For example, the second communication method may be a UWB communication method, and the first communication method may be a communication method different from the second communication method. For example, the first communication method may be, but is not limited to, a Bluetooth communication method.

The processor 1804 according to an embodiment of the disclosure may control an overall operation of the first electronic device 1802 by executing a program stored in the memory 1808, and may include at least one processor, such as a central processing unit (CPU) or a graphics processing unit (GPU). The processor 1804 may control other elements included in the first electronic device 1802 to perform UWB ranging.

The embodiments of the disclosure described above may be implemented as a software (S/W) program including instructions stored in a computer-readable storage medium.

A computer may be a device for calling the instructions stored in the computer-readable storage medium and performing, in response to the called instructions, operations according to the embodiments of the disclosure described above, and may include an image transmitting apparatus and an image receiving apparatus according to the embodiments of the disclosure.

The computer-readable storage medium may be provided in the form of a non-transitory storage medium. Here, 'non-transitory' means that the storage medium does not include a signal and is tangible, but does not distinguish whether data is stored semi-permanently or temporarily in the storage medium.

In addition, the electronic device or the method according to the embodiments of the disclosure may be provided in a computer program product. The computer program product is a product purchasable between a seller and a purchaser.

The computer program product may include an S/W program and a computer-readable storage medium in which the S/W program is stored. For example, the computer program product may include an S/W program-type product (e.g., a downloadable application) electronically distributed through a manufacturer of the electronic device or an electronic market (e.g., Google Play™ store or App Store). For electronic distribution, at least a portion of the S/W program may be stored in a storage medium or temporarily generated. In this case, the storage medium may be a server of the manufacturer, a server of the electronic market, or a storage medium of a relay server that temporarily stores the S/W program.

The computer program product may include a storage medium of a server or a storage medium of a terminal in a system including the server and the terminal (e.g., an image transmitting apparatus or an image receiving apparatus). Alternatively, when there is a third device (e.g., a smartphone) connected to the server or the terminal for communication, the computer program product may include a storage medium of the third device. Alternatively, the computer program product may directly include an S/W program transmitted from the server to the terminal or the third device or transmitted from the third device to the terminal.

In this case, any one of the server, the terminal, and the third device may perform the method according to the embodiments of the disclosure by executing the computer program product. Alternatively, at least two of the server, the terminal, and the third device may perform the method according to the embodiments of the disclosure by executing the computer program product in a distributed fashion.

For example, the server (e.g., a cloud server or an AI server) may execute the computer program product stored in the server to control the terminal connected to the server for communication to perform the method according to the embodiments of the disclosure.

As another example, the third device may execute the computer program product to control the terminal connected to the third device for communication to perform the method according to the embodiments of the disclosure. As a specific example, the third device may remotely control the image transmitting apparatus or the image receiving apparatus to transmit or receive a packing image.

When the third device executes the computer program product, the third device may download the computer program product from the server and execute the downloaded computer program product. Alternatively, the third device may execute the computer program product provided in a pre-loaded state to perform the method according to the embodiments of the disclosure.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a first electronic device in a wireless communication system, the method comprising:
   identifying, from among one or more electronic devices, a second electronic device selected by a user, based on a first distance and a second distance, wherein the first distance between the first electronic device and the second electronic device is obtained based on an optical sensor and the second distance between the first electronic device and the second electronic device is obtained based on an ultra-wideband (UWB) ranging;
   determining first location information associated with a target point based on the optical sensor and gradient information of the first electronic device;
   determining second location information associated with the second electronic device based on the first location information and a UWB signal;
   determining third location information indicating a location of the target point relative to the second electronic device based on the first location information and the second location information; and
   transmitting the third location information to the second electronic device, for the second electronic device to perform an operation associated with the target point.

2. The method of claim 1, wherein the determining of the first location information comprises:
   correcting a location of the target point in case that an obstacle is located between the first electronic device and the target point; and
   determining the first location information based on the corrected location of the target point.

3. The method of claim 2, wherein the correcting of the location of the target point comprises correcting the location of the target point, for the target point to be located on a surface on which the second electronic device is located, according to whether the target point is located on the surface on which the second electronic device is located, based on the optical sensor and the gradient information.

4. The method of claim 3, wherein the determining of the first location information comprises:
   determining third distance information indicating a first distance between the target point and the first electronic device, based on the optical sensor;
   determining first angle information indicating an elevation angle of the first electronic device with respect to the target point, based on the gradient information; and
   determining height information indicating a height of the first electronic device with respect to the target point, based on the third distance information and the first angle information.

5. The method of claim 4, wherein the determining of the second location information comprises:
   obtaining fourth distance information indicating a distance between the first electronic device and the second electronic device via the UWB signal; and
   determining second angle information indicating an elevation angle of the first electronic device with respect to the second electronic device, based on the fourth distance information and the height information.

6. The method of claim 5, wherein the determining of the third location information comprises:
   determining fifth distance information associated with an orthogonal projection onto the surface of a line segment associated with the fourth distance information, based on the second angle information; and
   determining sixth distance information associated with an orthogonal projection onto the surface of a line segment associated with the third distance information, based on the gradient information and third angle information indicating an elevation angle of the target point with respect to the first electronic device.

7. The method of claim 6, wherein the determining of the third location information comprises:
   determining fourth angle information indicating an azimuth angle of the first electronic device with respect to the second electronic device;
   determining fifth angle information indicating an azimuth angle of the second electronic device with respect to the first electronic device;
   determining sixth angle information indicating an azimuth angle of the target point with respect to the first electronic device; and
   determining coordinates of the target point relative to the second electronic device, based on the fifth distance information, sixth distance information, fourth angle information, fifth angle information, and sixth angle information.

8. The method of claim 7, wherein the determining of the third location information comprises correcting the fourth angle information and the fifth angle information, based on the second angle information and seventh angle information indicating an elevation angle of the second electronic device with respect to the first electronic device obtained via the UWB signal.

9. A method performed by a first electronic device in a wireless communication system, the method comprising:
   determining height information indicating a height of the first electronic device with respect to a second electronic device based on an ultra-wideband (UWB) signal and gradient information of the first electronic device;
   determining distance information associated with an orthogonal projection onto a surface, on which a target point is located, of a line segment associated with a distance between the first electronic device and the target point, based on the height information and the gradient information;
   determining location information indicating a location of the target point relative to the second electronic device based on the distance information; and
   transmitting the location information to the second electronic device for the second electronic device to perform an operation associated with the target point.

10. The method of claim 9, wherein the determining of the height information comprises:
- determining, via the UWB signal, a distance between the first electronic device and the second electronic device; and
- determining, via the UWB signal, first angle information indicating an elevation angle of the second electronic device with respect to the first electronic device.

11. The method of claim 10, wherein the determining of the height information comprises:
- determining second angle information indicating an elevation angle of the first electronic device with respect to the second electronic device, based on the gradient information and the first angle information; and
- determining the height information, based on the second angle information and the distance between the first electronic device and the second electronic device.

12. The method of claim 9, the method further comprising:
- determining first distance information indicating a first distance between the first electronic device and the second electronic device selected by a user, wherein the first distance is obtained based on an optical sensor;
- determining second distance information indicating a second distance between the first electronic device and the second electronic device, wherein the second distance is obtained based on a UWB ranging; and
- identifying the second electronic device from among one or more electronic devices, based on the first distance information and the second distance information.

13. A first electronic device in a wireless communication system, the first electronic device comprising:
- a communicator;
- an optical sensor configured to output an optical signal;
- a gradient sensor configured to obtain gradient information of the first electronic device; and
- at least one processor configured to:
  - identify, from among one or more electronic devices, a second electronic device selected by a user, based on a first distance and a second distance, wherein the first distance between the first electronic device and the second electronic device is obtained based on the optical sensor and the second distance between the first electronic device and the second electronic device is obtained based on an ultra-wideband (UWB) ranging,
  - determine first location information associated with a target point, based on the optical sensor and the obtained gradient information,
  - determine second location information associated with the second electronic device, based on the first location information and a UWB signal,
  - determine third location information indicating a location of the target point relative to the second electronic device, based on the first location information and the second location information, and
  - transmit the third location information via the communicator to the second electronic device, for the second electronic device to perform an operation associated with the target point.

14. The first electronic device of claim 13, wherein the at least one processor is further configured to:
- correct a location of the target point in case that an obstacle is located between the first electronic device and the target point, and
- determine the first location information, based on the corrected location of the target point.

15. The first electronic device of claim 13, wherein the at least one processor is further configured to:
- determine third distance information indicating a first distance between the target point and the first electronic device, based on the optical sensor,
- determine first angle information indicating an elevation angle of the first electronic device with respect to the target point, based on the gradient information, and
- determine height information indicating a height of the first electronic device with respect to the target point, based on the third distance information and the first angle information.

16. The first electronic device of claim 15, wherein the at least one processor is further configured to:
- obtain, via the UWB signal, fourth distance information indicating a distance between the first electronic device and the second electronic device, and
- determine second angle information indicating an elevation angle of the first electronic device with respect to the second electronic device, based on the fourth distance information and the height information.

17. A first electronic device in a wireless communication system, the first electronic device comprising:
- a communicator;
- an acceleration sensor configured to obtain gradient information of the first electronic device; and
- at least one processor configured to:
  - determine height information indicating a height of the first electronic device with respect to a second electronic device, based on an ultra-wideband (UWB) signal and the gradient information of the first electronic device,
  - determine distance information associated with an orthogonal projection onto a surface, on which a target point is located, of a line segment associated with a distance between the first electronic device and the target point, based on the height information and the gradient information,
  - determine location information indicating a location of the target point relative to the second electronic device, based on the distance information, and
  - transmit the location information via the communicator to the second electronic device, for the second electronic device to perform an operation associated with the target point.

* * * * *